(12) United States Patent
Yang et al.

(10) Patent No.: US 11,882,564 B2
(45) Date of Patent: *Jan. 23, 2024

(54) METHOD AND APPARATUS FOR TRANSMITTING AND RECEIVING SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Duckhyun Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,677

(22) Filed: Jan. 12, 2023

(65) Prior Publication Data

US 2023/0156713 A1 May 18, 2023

Related U.S. Application Data

(63) Continuation of application No. 17/713,828, filed on Apr. 5, 2022.
(Continued)

(30) Foreign Application Priority Data

Apr. 5, 2021 (KR) .......................... 10-2021-0044279
Aug. 5, 2021 (KR) .......................... 10-2021-0103387
(Continued)

(51) Int. Cl.
*H04W 72/21* (2023.01)
*H04L 5/00* (2006.01)
(Continued)

(52) U.S. Cl.
CPC ........... *H04W 72/21* (2023.01); *H04L 1/1854* (2013.01); *H04L 5/0057* (2013.01); *H04W 72/56* (2023.01)

(58) Field of Classification Search
None
See application file for complete search history.

(56) References Cited

U.S. PATENT DOCUMENTS

2019/0199420 A1* 6/2019 Faxér ................... H04B 7/0639
2019/0349917 A1 11/2019 Huang et al.
(Continued)

FOREIGN PATENT DOCUMENTS

WO  WO 2020/202068   10/2020
WO  WO 2021/029816    2/2021
(Continued)

OTHER PUBLICATIONS

International Search Report in International Appln. PCT/KR2022/004828, dated Jul. 25, 2022, 8 pages.
(Continued)

*Primary Examiner* — Hassan A Phillips
*Assistant Examiner* — Gautam Sharma
(74) *Attorney, Agent, or Firm* — Fish & Richardson P.C.

(57) ABSTRACT

A user equipment (UE) operation related to at least one of embodiments of the disclosure may include multiplexing a plurality of UCIs on a single physical uplink shared channel (PUSCH), and transmitting the single PUSCH in which the plurality of UCIs are multiplexed. Based on that the UE is configured to multiplex UCIs having different priorities on the same PUSCH, that a priority of a first UCI included in the plurality of UCIs is Priority-H higher than Priority-L, and that the first UCI with the Priority-H includes 2-part channel state information (CSI), the UE may drop all hybrid automatic repeat request-acknowledgement (HARQ-ACK) information of a second UCI with the Priority-L lower than the Priority-H, and map a first part of the CSI and a second part of the CSI onto the single PUSCH.

15 Claims, 14 Drawing Sheets

Related U.S. Application Data

(60) Provisional application No. 63/302,116, filed on Jan. 23, 2022, provisional application No. 63/254,156, filed on Oct. 10, 2021.

(30) Foreign Application Priority Data

Jan. 10, 2022 (KR) ........................ 10-2022-0003493
Feb. 11, 2022 (KR) ........................ 10-2022-0018243

(51) Int. Cl.
*H04L 1/1829* (2023.01)
*H04W 72/56* (2023.01)

(56) References Cited

U.S. PATENT DOCUMENTS

| | | | |
|---|---|---|---|
| 2021/0007129 A1* | 1/2021 | Talarico | H04W 72/1268 |
| 2021/0259010 A1* | 8/2021 | Yang | H04W 72/569 |
| 2022/0039029 A1* | 2/2022 | Zhang | H04W 52/34 |
| 2022/0150924 A1* | 5/2022 | Gao | H04L 1/189 |
| 2022/0369336 A1* | 11/2022 | Huang | H04W 72/569 |

FOREIGN PATENT DOCUMENTS

| | | |
|---|---|---|
| WO | WO 2022/034641 | 2/2022 |
| WO | WO 2022/039164 | 2/2022 |

OTHER PUBLICATIONS

OPPO, "Summary#1 of email thread [104-e-NR-R17-IIoT_URLLC-04]," R1-2101842, Presented at 3GPP TSG RAN WG1 #104-e, e-Meeting, Jan. 25-Feb. 5, 2021, 124 pages.

Samsung, "Uplink intra-UE multiplexing and prioritization," R1-2101204, Presented at 3GPP TSG RAN WG1 #104-e, e-Meeting, Jan. 25-Feb. 5, 2021, 9 pages.

Moderator (Huawei), "FL summary#3 on improving reliability for MBS for RRC_Connected Ues," 3GPP TSG RAN WG1 Meeting #104-e, R1-2101987, E-meeting, Jan. 25-Feb. 5, 2021, 69 pages.

Moderator (OPPO), "Summary#1 of email thread [103-e-NR-IIOT_URLLC_enh-04]," 3GPP TSG RAN WG1 #102-e, R1-2009546, e-Meeting, Aug. 17-28, 2020, 96 pages.

* cited by examiner

METHOD AND APPARATUS FOR TRANSMITTING AND RECEIVING SIGNAL IN WIRELESS COMMUNICATION SYSTEM

CROSS-REFERENCE TO RELATED APPLICATIONS

This application is a continuation of U.S. application Ser. No. 17/713,828, filed on Apr. 5, 2022, which claims the benefit of Korean Application No. 10-2022-0018243, filed on Feb. 11, 2022, U.S. Provisional Application No. 63/302,116, filed on Jan. 23, 2022, Korean Application No. filed on Jan. 10, 2022, U.S. Provisional Application No. 63/254,156, filed on Oct. 10, 2021, Korean Application No. 10-2021-0103387, filed on Aug. 5, 2021, and Korean Application No. 10-2021-0044279, filed on Apr. 5, 2021. The disclosures of the prior applications are incorporated by reference in their entirety.

TECHNICAL FIELD

The disclosure relates to a wireless communication system, and more particularly, to a method and apparatus for transmitting/receiving an uplink/downlink wireless signal in a wireless communication system.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An object of the disclosure is to provide a method of efficiently performing wireless signal transmission/reception procedures and an apparatus therefor.

It will be appreciated by persons skilled in the art that the objects that could be achieved with the disclosure are not limited to what has been particularly described hereinabove and the above and other objects that the disclosure could achieve will be more clearly understood from the following detailed description.

According to an aspect of the disclosure, a method of transmitting uplink control information (UCI) by a user equipment (UE) in a wireless communication system may include multiplexing a plurality of UCIs on a single physical uplink shared channel (PUSCH), and transmitting the single PUSCH in which the plurality of UCIs are multiplexed. Based on i) that the UE is configured to multiplex UCIs having different priorities on the same PUSCH, ii) that a priority of a first UCI included in the plurality of UCIs is Priority-H higher than Priority-L, and iii) that the first UCI with the Priority-H includes 2-part channel state information (CSI), the UE may drop all hybrid automatic repeat request-acknowledgement (HARQ-ACK) information of a second UCI with the Priority-L lower than the Priority-H, and map a first part of the CSI and a second part of the CSI onto the single PUSCH.

In a state in which the first UCI with the Priority-H does not include any HARQ-ACK information, the UE may perform resource element (RE) reservation for a potential HARQ-ACK related to the Priority-H on the single PUSCH.

In a state in which the first UCI with the Priority-H does not include any HARQ-ACK information, the UE may perform the multiplexing, assuming that a potential HARQ-ACK related to the Priority-H is UCI type 1.

The UE may perform the multiplexing, assuming that the first part of the CSI and the second part of the CSI are UCI type 2 and UCI type 3, respectively.

Based on HARQ-ACK information not exceeding 2 bits in the first UCI with the Priority-H, the UE may perform RE reservation for a potential HARQ-ACK related to the Priority-H on the single PUSCH, regardless of whether an actual HARQ-ACK related to the Priority-H exists.

The UE may map the first part of the CSI to REs on the single PUSCH, except for specific REs reserved through the RE reservation among available REs of the single PUSCH, and sequentially map the second part of the CSI and data to remaining REs including the specific REs on the single PUSCH, after mapping the first part.

Based on the presence of an actual 1-bit or 2-bit HARQ-ACK related to the Priority-H, the UE may puncture the specific REs reserved through the RE reservation and map the 1-bit or 2-bit HARQ-ACK related to the Priority-H, after mapping the second part and the data.

The single PUSCH may be a PUSCH with the Priority-H.

The first part of the CSI with the Priority-H and the second part of the CSI may be related to aperiodic CSI reporting.

According to an aspect of the disclosure, a processor-readable recording medium recording instructions for performing the above UCI transmission method may be provided.

According to an aspect of the disclosure, a UE for performing the above UCI transmission method may be provided.

According to an aspect of the disclosure, a device for controlling a UE for performing the above UCI transmission method may be provided.

According to an aspect of the disclosure, a method of receiving UCI by a BS in a wireless communication system may include receiving a single PUSCH from a UE, and obtaining a plurality of UCIs multiplexed on the received single PUSCH. Based on i) that the BS configures the UE to multiplex UCIs having different priorities on the same PUSCH, ii) that a priority of a first UCI included in the plurality of UCIs is Priority-H higher than Priority-L, and iii) that the first UCI with the Priority-H includes 2-part CSI, the BS may perform demultiplexing for a first part of the CSI and a second part of the CSI on the single PUSCH, assuming that all HARQ-ACK information of the second UCI with the Priority-L lower than the Priority-H.

According to an aspect of the disclosure, a BS for performing the above signal reception method may be provided.

According to the disclosure, wireless signal transmission and reception may be efficiently performed in a wireless communication system.

It will be appreciated by persons skilled in the art that the effects that can be achieved with the disclosure are not limited to what has been particularly described hereinabove and other advantages of the disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
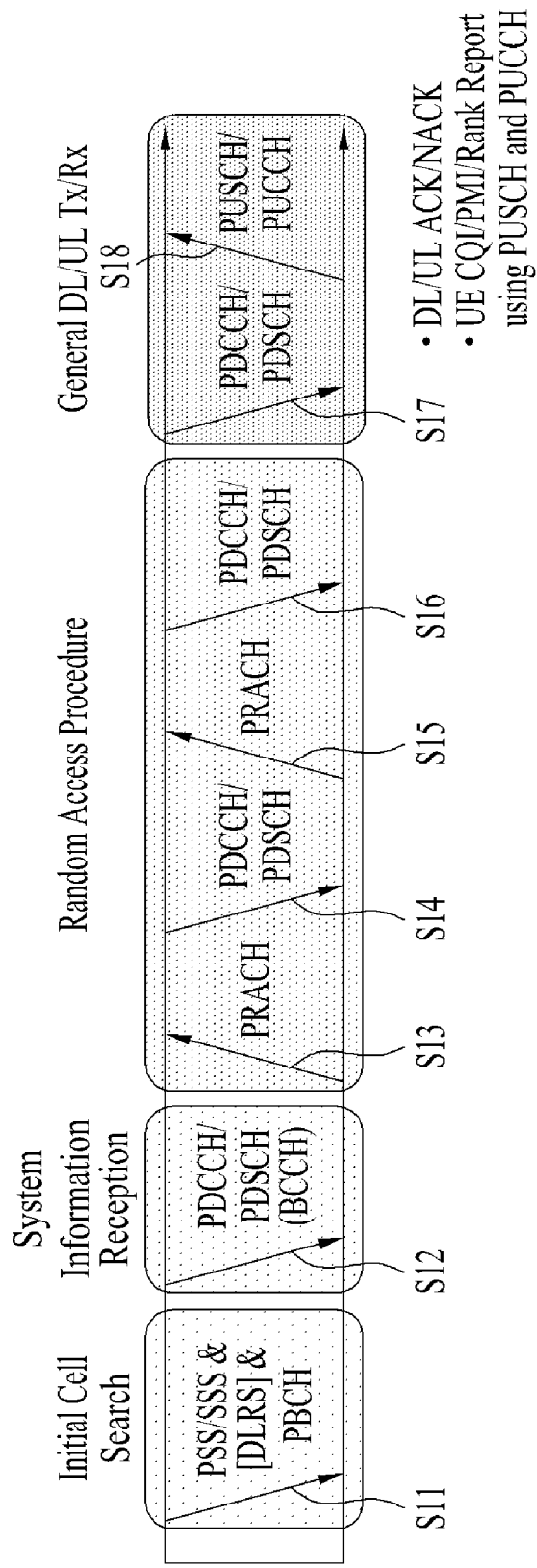
FIG. 1 illustrates physical channels used in a 3rd generation partnership project (3GPP) system as an exemplary wireless communication system, and a general signal transmission method using the same.

Embodiments of the disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the disclosure, for simplicity, this technology will be referred to as NR (New Radio or New RAT).

For the sake of clarity, 3GPP NR is mainly described, but the technical idea of the disclosure is not limited thereto.

In the disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options; methods, schemes, and so on are distinguished from each other and indexed, for convenience of description, which does not mean that each of them necessarily constitutes an independent invention or that each of them should be implemented only individually. Unless explicitly contradicting each other, it may be derived/understood that at least some of the sections, embodiments, examples, options, methods, schemes, and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
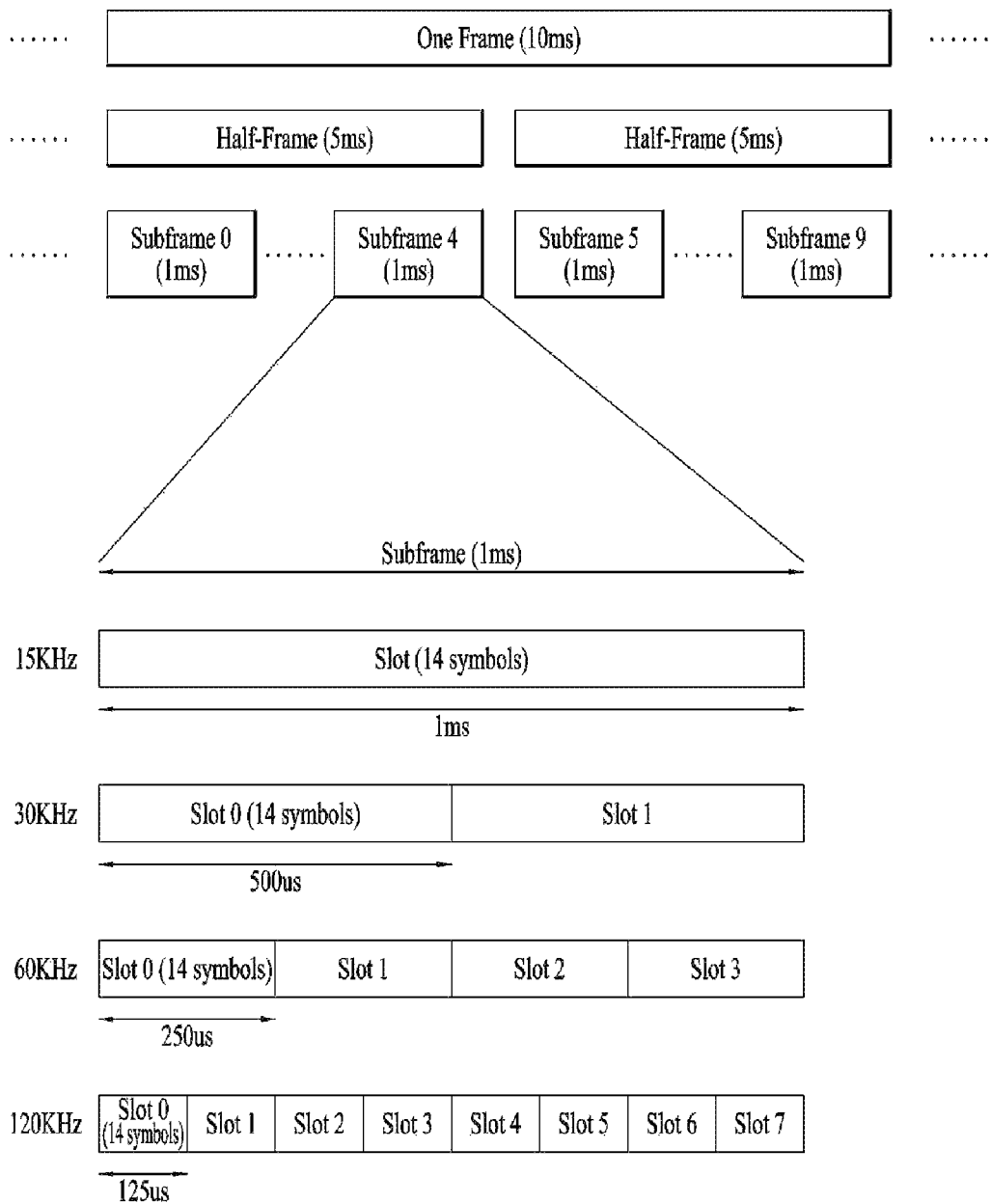
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
| --- | --- | --- | --- |
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
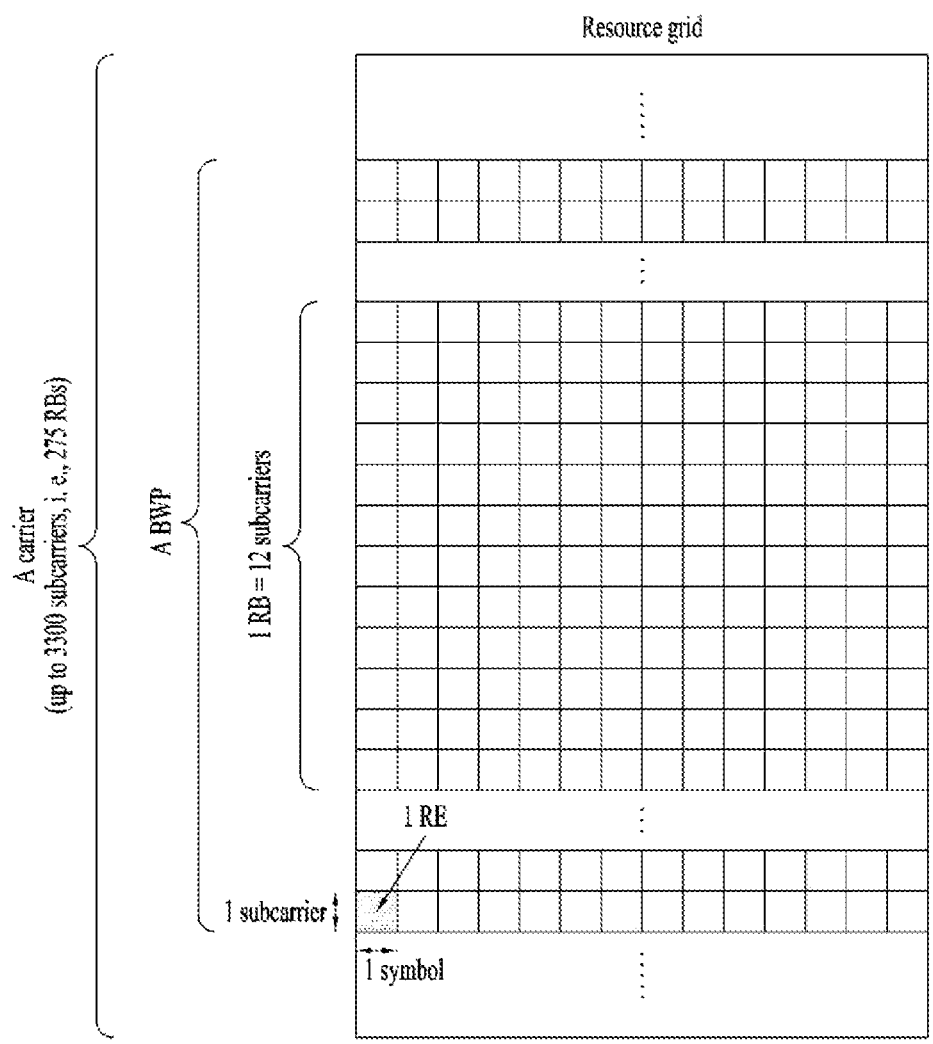
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
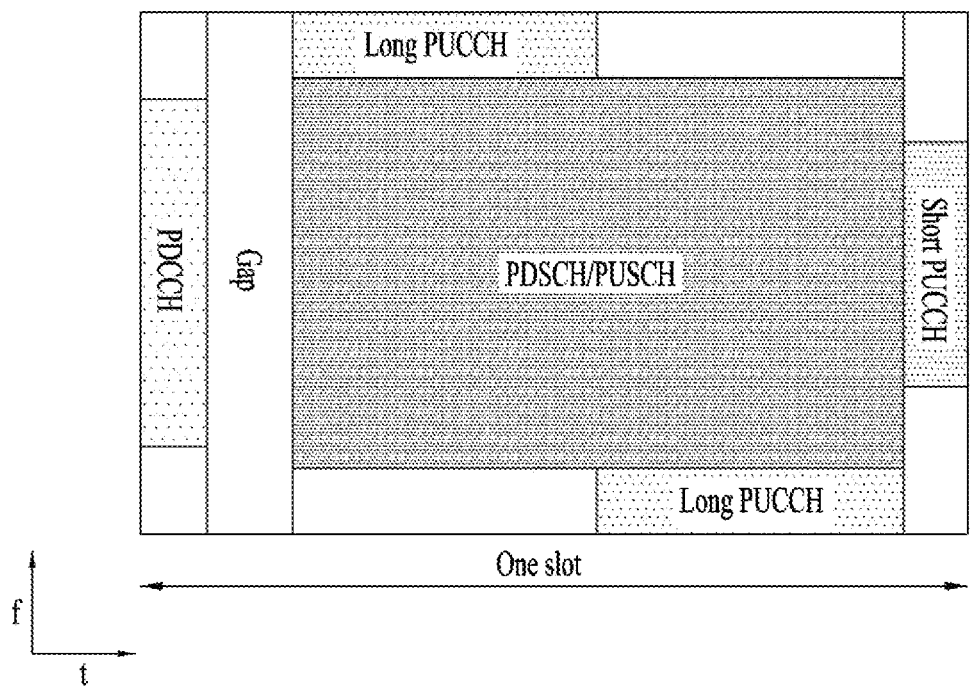
FIG. 4 illustrates exemplary mapping of physical channels in a slot.

FIG. 4 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured by higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.
monitoringSlotPeriodicityAndOffset: A PDCCH monitoring periodicity (in slots) and a PDCCH monitoring offset (in slots).
monitoringSymbolsWithinSlot: PDCCH monitoring symbols in a slot (e.g., the first symbol(s) of a CORESET).
nrofCandidates: The number of PDCCH candidates (one of 0, 1, 2, 3, 4, 5, 6, and 8) for each AL={1, 2, 4, 8, 16}.
An occasion (e.g., time/frequency resources) in which the UE is to monitor PDCCH candidates is defined as a PDCCH (monitoring) occasion. One or more PDCCH (monitoring) occasions may be configured in a slot.
Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |

TABLE 3-continued

| Type | Search Space | RNTI | Use Case |
| --- | --- | --- | --- |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.
SR(Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | >2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4 , #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 5:
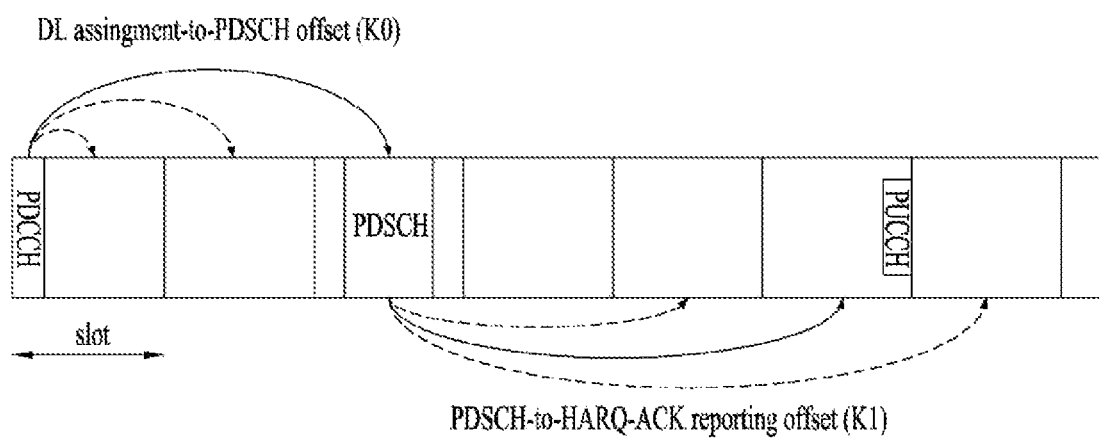
FIG. 5 illustrates an exemplary physical downlink shared channel (PDSCH) transmission and reception process.

FIG. 5 illustrates an exemplary ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bitwise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 6:
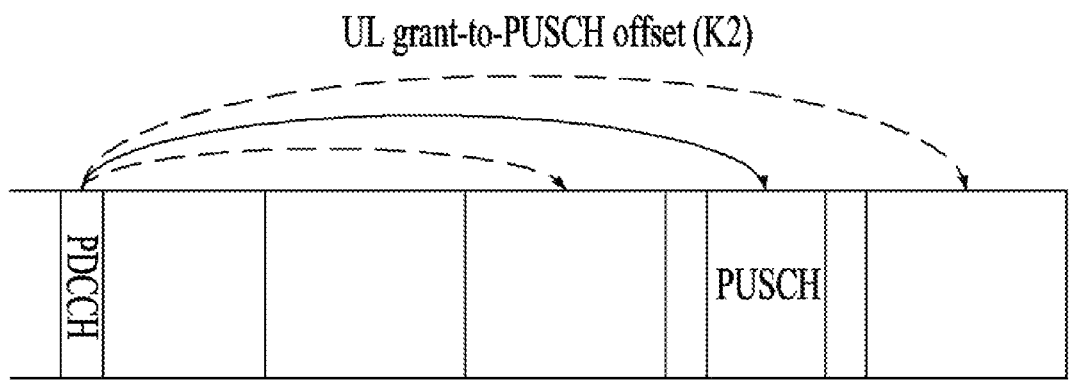
FIG. 6 illustrates an exemplary physical uplink shared channel (PUSCH) transmission and reception process.

FIG. 6 illustrates an exemplary PUSCH transmission procedure. Referring to FIG. 6, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Figure 7:
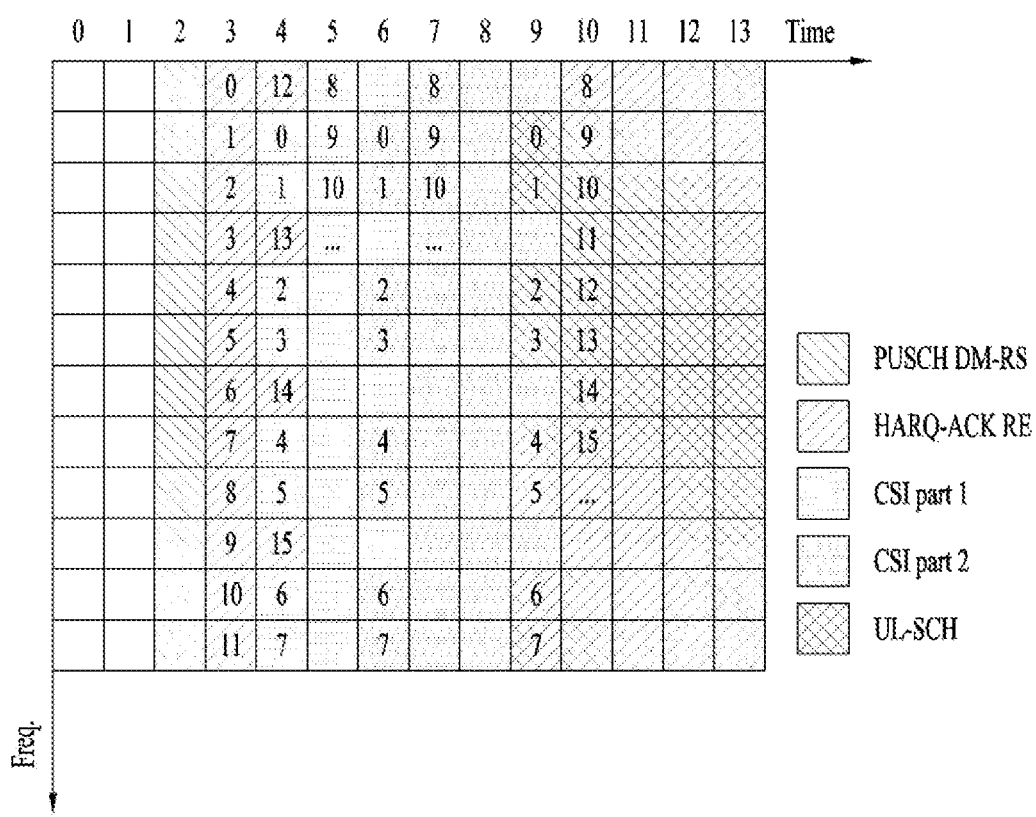
FIG. 7 illustrates an example of multiplexing control information in a PUSCH.

FIG. 7 illustrates exemplary multiplexing of UCI in a PUSCH. When a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 7, an HARQ-ACK and CSI are carried in a PUSCH resource.

For piggyback of an HARQ-ACK to a PUSCH in NR Rel. 16, when the payload of the HARQ-ACK is 2 or fewer bits, PUSCH data REs (and/or CSI part 2 REs) are punctured, and when the payload of the HARQ-ACK is more than 2 bits, rate-matching is performed. Table 6 describes HARQ-ACK rate matching of UCI in TS38.212.

TABLE 6

6.3.2.4  Rate matching
6.3.2.4.1  UCI encoded by Polar code
6.3.2.4.1.1  HARQ-ACK
For HARQ-ACK transmission on PUSCH with UL-SCH, the number of coded modulation symbols per layer for HARC-ACK transmission, denoted as $Q'_{ACK}$, is determined as follows:

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$

where
- $O_{ACK}$ is the number HARQ-ACK bits;
- if $O_{ACK} \geq 360$, $L_{ACK} = 11$; otherwise $L_{ACK}$ is the number of CRC bits for HARQ-ACK determined according to Clause 6.3.1.2.1;
- $\beta_{offset}^{PUSCH} = \beta_{offset}^{HARK-ACK}$;
- $C_{UL-SCH}$ is the number of code blocks for UL-SCH of the PUSCH transmission;
- if the DCI format scheduling the PUSCH transmission includes a CBGTI field indicating that the UE shall not transmit the r-th code block, $K_r = 0$; otherwise, $K_r$ is the r -th code block size for UL-SCH of the PUSCH transmission;
- $M_{sc}^{PUSCH}$ is the scheduled bandwidth of the PUSCH transmission, expressed as a number of subcarriers;
- $M_{sc}^{PT-RS}(l)$ is the number of subcarriers in OFDM symbol l that carries PTRS, in the PUSCH transmission;
- $M_{sc}^{UCI}(l)$ is the number of resource elements that can be used for transmission of UCI in OFDM symbol l , for $l = 0, 1, 2, \ldots, N_{symb,all}^{PUSCH} - 1$, in the PUSCH transmission and $N_{symb,all}^{PUSCH}$ is the total number of OFDM symbols of the PUSCH, including all OFDM symbols used for DMRS;
  - for any OFDM symbol that carries DMRS of the PUSCH, $M_{sc}^{UCI}(l) = 0$;
  - for any OFDM symbol that does not carry DMRS of the PUSCH, $M_{sc}^{UCI}(l) = M_{sc}^{PUSCH} - M_{sc}^{PT-RS}(l)$;
- $\alpha$ is configured by higher layer parameter scaling;
- $l_0$ is the symbol index of the first OFDM symbol that does not carry DMRS of the PUSCH, after the first DMRS symbol(s), in the PUSCH transmission.

For HARQ-ACK transmission on an actual repetition of a PUSCH with repetition Type B with UL-SCH, the number of coded modulation symbols per layer for HARQ-ACK transmission, denoted as $Q'_{ACK}$, is determined as follows:

TABLE 6-continued $$Q'_{ACK} = \min\left\{\left\lceil\frac{(O_{ACK} + L_{ACK}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r}\right\rceil, \left\lceil\alpha \cdot \sum_{l=0}^{N_{symb,nominal}^{PUSCH}-1} M_{sc,nominal}^{UCI}(l)\right\rceil, \sum_{l=0}^{N_{symb,actual}^{PUSCH}-1} M_{sc,actual}^{UCI}(l)\right\}$$

where
- $M_{sc,nominal}^{UCI}(l)$ is the number of resource elements that can be used for tansmission of UCI in OFDM symbol l, for l = 0, 1, 2, ..., $N_{symb,nominal}^{PUSCH}$ − 1, in the PUSCH transmission assuming a nominal repetition without segmentation, and $N_{symb,nominal}^{PUSCH}$ is the total number of OFDM symbols in a nominal repetition of the PUSCH, including all OFDM symbols used for DMRS;
- for any OFDM symbol that carries DMRS of the PUSCH assuming a nominal repetition without segmentation, $M_{sc,nominal}^{UCI}(l) = 0$;
- for any OFDM symbol that does not carry DMRS of the PUSCH assuming a nominal repetition without segmentation, and $M_{sc,nominal}^{UCI}(l) = M_{sc}^{PUSCH} - M_{sc,nominal}^{PT-RS}(l)$ where $M_{sc,nominal}^{PT-RS}(l)$ is the number of subcarriers in OFDM symbol l that carries PTRS, in the PUSCH transmission assuming a nominal repetition without segmentation;
- $M_{sc,actual}^{UCI}(l)$ is the number of resource elements that can be used for transmission of UCI in OFDM symbol l, for l = 0, 1, 2, ..., $N_{symb,actual}^{PUSCH}$ − 1, in the actual repetition of the PUSCH transmission, and $N_{symb,actual}^{PUSCH}$ is the total number of OFDM symbols in the actual repetition of the PUSCH transmission, including all OFDM symbols used for DMRS;
- for any OFDM symbol that carries DMRS of the actual repetition of the PUSCH transmission, $M_{sc,actual}^{UCI}(l) = 0$;
- for any OFDM symbol that does not carry DMRS of the actual repetition of the PUSCH transmission, $M_{sc,actual}^{UCI}(l) = M_{sc}^{PUSCH} - M_{sc,actual}^{PT-RS}(l)$ where $M_{sc,actual}^{PT-RS}(l)$ is the number of subcarriers in OFDM symbol l that carries PTRS, in the actual repetition of the PUSCH transmission;
- and all the other notations in the formula are defined the same as for PUSCH not using repetition type B.

For HARQ-ACK transmission on PUSCH without UL-SCH, the number of coded modulation symbols per layer for HARQ-ACK transmission, denoted as $Q'_{ACK}$, is determined as follows:

$$Q'_{ACK} = \min\left\{\left\lceil\frac{(O_{ACK} + L_{ACK}) \cdot \beta_{offset}^{PUSCH}}{R \cdot Q_m}\right\rceil, \left\lceil\alpha \cdot \sum_{l=l_0}^{N_{symb,all}^{PUSCH}-1} M_{sc}^{UCI}(l)\right\rceil\right\}$$

where
- $O_{ACK}$ is the number of HARK-ACK bits;
- if $O_{ACK} \geq 360$, $L_{ACK} = 11$; otherwise $L_{ACK}$ is the number of CRC bits for HARQ-ACK defined according to Clause 6.3.1.2.1;;
- $\beta_{offset}^{PUSCH} = \beta_{offset}^{HARK-ACK}$;
- $M_{sc}^{PUSCH}$ is the scheduled bandwidth of the PUSCH transmission, expresed as a number of subcarriers;
- $M_{sc}^{PT-RS}(l)$ is the number of subcarriers in OFDM symbol l that carries PTRS, in the PUSCH transmission;
- $M_{sc}^{UCI}(l)$ is the number of resource elements that can be used for transmission of UCI in OFDM symbol l, for l = 0, 1, 2, ..., $N_{symb,all}^{PUSCH}$ − 1, in the PUSCH transmission and $N_{symb,all}^{PUSCH}$ is the total number of OFDM symbols of the PUSCH, including all OFDM symbols used for DMRS;
  - for any OFDM symbol that carries DMRS of the PUSCH, $M_{sc}^{UCI}(l) = 0$;
  - for any OFDM symbol that does not carry DMRS of the PUSCH, $M_{sc}^{UCI}(l) = M_{sc}^{PUSCH} - M_{sc}^{PT-RS}(l)$;
- $l_0$ is the symbol index of the first OFDM symbol that does not carry DMRS of the PUSCH, after the first DMRS symbol(s), in the PUSCH transmission;
- R is the code rate of the PUSCH, determined according to Clause 6.1.4.1 of [6, TS38.214];
- $Q_m$ is the modulation order of the PUSCH;
- $\alpha$ is configured by higher layer parameter scaling.

In Table 6, a beta offset '$\beta_{offset}^{PUSCH}$', which is a weight for rate-matching of UCI on a PUSCH, is related to the amount of resources to be used for an HARQ-ACK and a CSI report during PUSCH transmission. A $\beta_{offset}$ set s may be configured by higher-layer signaling. A specific set may be used semi-statically, or a $\beta_{offset}$ set may be indicated dynamically by DCI (e.g., DCI format 0_1/0_2). In the dynamic $\beta_{offset}$ indication scheme, a beta offset indication field of DCI includes two bits indicating one of four $\beta_{offset}$ sets configured for a UE. Each $\beta_{offset}$ set includes three $\beta_{offset}$ values applicable to an HARQ-ACK, two $\beta_{offset}$ values for CSI Part 1, and two $\beta_{offset}$ values for CSI Part 2, and a specific $\beta_{offset}$ is selected according to a corresponding payload size. For example, a first $\beta_{offset}^{HARQ-ACK}$ value may be used to transmit M HARQ-ACKs on the PUSCH, and a second $\beta_{offset}^{HARQ-ACK}$ value may be used to transmit N HARQ-ACKs on the PUSCH.

The meanings of terms as used herein are summarized as follows. To help the understanding of the terms, FIG. 5/6 and its description may be referred to.

K0 (DL assignment-to-PDSCH offset): A slot interval between a DCI transmission slot and a PDSCH transmission slot (scheduled by corresponding DCI).

SLIV (Start and Length Indicator Value): Information about the starting symbol and symbol duration (or ending symbol) of a PDSCH (PDSCH occasion).

Mapping type: Information indicating whether the position of a DMRS symbol of a PDSCH is determined based on a symbol index within a slot duration or within a PDSCH duration.

TDRA (Time Domain Resource Assignment) table: Includes a plurality of {K0, SLIV, mapping type} combinations (configured by RRC) (one combination is mapped to each of a plurality of rows in the table). A specific one row is indicated by DCI.

K1 (PDSCH-to-HARQ_feedback timing indicator): A slot interval between a PDSCH transmission slot and an HARQ-ACK transmission slot (for a corresponding PDSCH reception).

Multiplexing Between UL Channels with Different Priorities (and/or Different TTI Lengths)

To recently support data transmission/services to which reliability/latency performance is important, such as URLLC, a service/protection priority (e.g., low priority (LP) or high priority (HP)) may be configured semi-statically for the UE (by RRC signaling or the like) or indicated dynamically to the UE (by DCI/MAC signaling).

Specifically, a priority indicator has been introduced to some DCI formats (e.g., DCI format 1_1/1_2 for DL, and DCI format 0_1/0_2 for UL) in NR Rel. 16. When it is configured by higher-layer signaling that the priority indicator will be provided for a corresponding DCI format, the UE performs blind-decoding for the DCI format, assuming the existence of the priority indicator. Without explicit signaling indicating that the priority indicator will be used for the DCI format by higher-layer signaling, the UE performs blind-decoding, assuming that a priority indicator field is not included in the DCI format. When no priority information is provided for a corresponding DL/UL signal, the UE may assume that the DL/UL signal has the LP (e.g., priority index=0). Those skilled in the art will understand that the priority indicator of DCI is a merely one of various means for indicating/configuring a priority, not the sole method.

In an example of the above prioritization, a lower priority index may be configured/indicated for the LP, and a higher priority index may be configured/indicated for the HP, or a lower bit value (e.g., bit '0') may be configured/indicated for the LP, and a higher bit value (e.g., bit '1') may be configured/indicated for the HP.

For example, a priority (e.g., LP or HP) may be configured/indicated for each PUCCH/PUSCH resource configured/indicated for each UCI type (e.g., HARQ-ACK, SR, and/or CSI) or for a corresponding UCI transmission. For example, the LP/HP may be indicated for an HARQ-ACK for a PDSCH by DL grant DCI that schedules the PDSCH. For example, the LP/HP may be indicated for (aperiodic) CSI by DCI (e.g., UL grant DCI scheduling a PUSCH).

In another example, (i) a PUCCH resource set may be configured independently for each priority, and/or (ii) a maximum UCI coding rate for PUCCH transmission may be configured independently for each priority. In another example, (iii) a beta offset βoffset for encoding UCI (e.g., for an HARQ-ACK and CSI Part 1/2, see Table 6) on a PUSCH may be configured independently for each priority and/or (iv) an HARQ-ACK codebook type may be configured independently for each priority. At least one or a combination of (i) to (iv) may be used.

In addition, to support low latency-based URLLC transmission, a sub-slot duration-based TTI length shorter than a slot duration-based TTI in legacy NR may be configured (especially for UCI/PUCCH/PUSCH transmission configured/indicated as having HP), and the UE/BS may operate to rapidly perform UL transmission in sub-slots. For example, the sub-slot duration may be set to 7 symbols (e.g., 2 sub-slots are configured in one slot) or 2 symbols (e.g., 7 sub-slots are configured in one slot), which should not be construed as limiting.

In legacy Rel-16, regarding a PUCCH/PUSCH transmission with each priority, (a) it is determined whether a UE processing time line (e.g., i) a minimum processing time N1 between the reception time of (the ending symbol of) a PDSCH and the transmission time of (the starting symbol of) a corresponding HARQ-ACK and/or ii) a minimum processing time N2 between the reception time of (the ending symbol of) a PDCCH and the transmission time of (the starting symbol of) a corresponding PUSCH/PUCCH) is satisfied, and (b) a UCI multiplexing process (in which a plurality of PUCCHs/PUSCHs overlapping with each other in time are merged (multiplexed) into one UL channel) is performed. When an outcome LP PUCCH and an outcome HP PUCCH corresponding to the result of the UCI multiplexing overlap with each other in time, only the HP PUCCH may be transmitted, while the LP transmission may be dropped. For example, when time resources of an LP PUCCH with multiplexed LP UCIs overlap with time resources of an HP PUCCH with multiplexed HP UCIs, the LP PUCCH is dropped, and only the HP PUCCH is transmitted, as defined in Rel. 16.

In contrast, LP and HP multiplexing may be configured, instead of prioritization-based drop in an LP and HP overlap situation in Rel-17. Accordingly, an LP and HP multiplexing rule may be required. The same or different TTI lengths may be configured for LP and HP. For example, a first TTI may be configured for LP, and a second TTI may be configured for HP. The first TTI may be longer than the second TTI, or vice versa.

While overlap between the time resources of LP PUCCH(s) and the time resources of HP PUCCH(s) is taken as a specific example of overlap between LP and HP, the disclosure may be applied to various overlaps between UL/DL channels, not limited to the above example.

On the assumption of an LP PUCCH and an HP PUCCH, for convenience, there is a need for defining a UE operation according to the UCI type of an HP PUCCH overlapping with an LP PUCCH and/or the PUCCH format type of LP/HP, and overlap between one LP PUCCH and a plurality of PUCCHs (or a plurality of sub-slots configured for HP).

Figure 8:
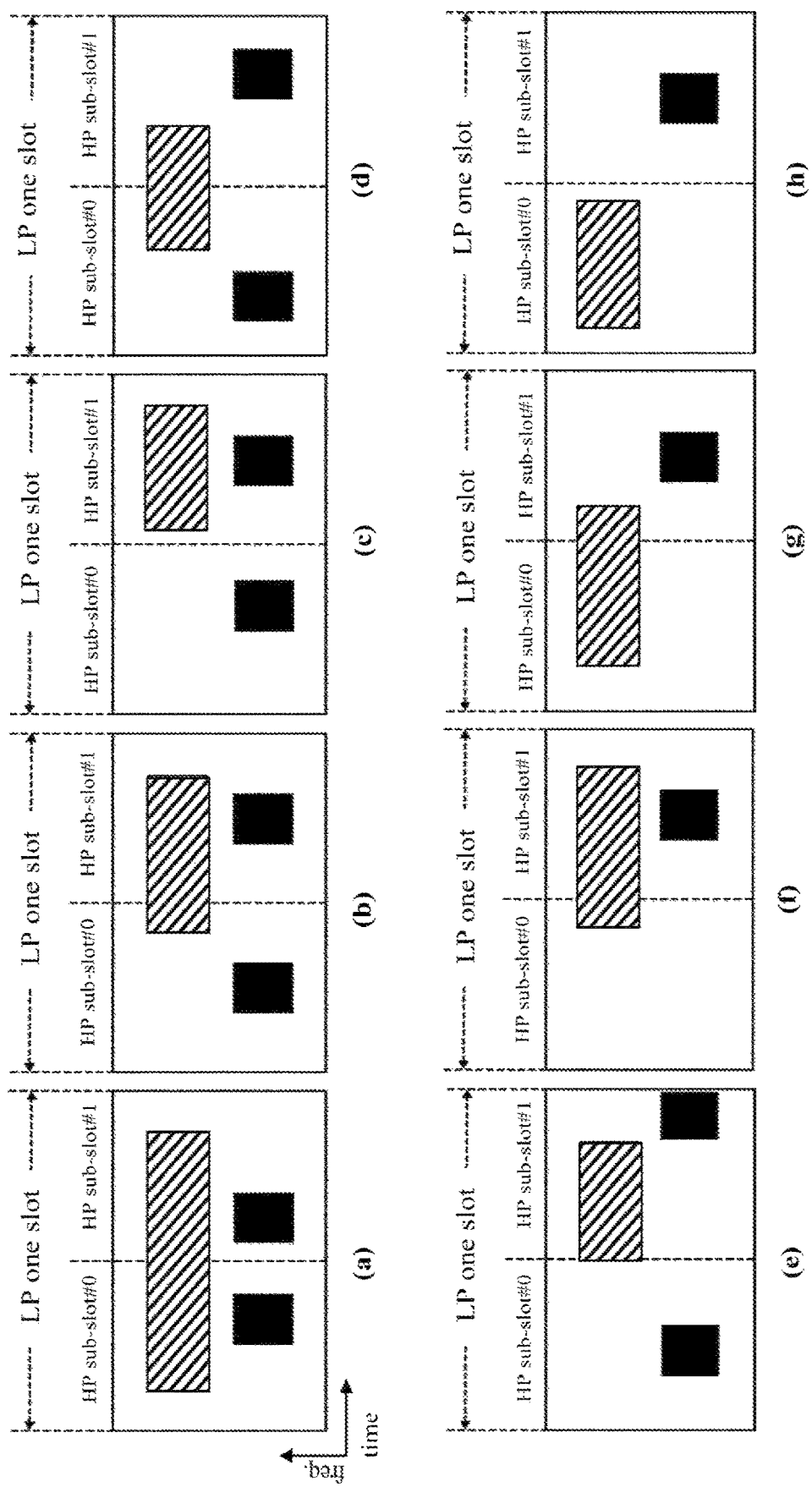
FIG. 8 illustrates various scenarios in which signals with different priorities overlap with each other.

An example of the disclosure proposes a UE operation method for UL multiplexed transmission, when one LP PUCCH overlaps in time with one or more (a plurality of) (TDMed) HP PUCCHs (e.g., when LP time resources and HP time resources overlap with each other at least partially) in a situation in which different TTI lengths are configured for LP and HP (e.g., as illustrated in FIG. 8).

For convenience of description, it is assumed below that a TTI length for LP transmission is set to a legacy slot duration, and a TTI length for HP transmission is set to a sub-slot duration. However, PROPOSALs of the disclosure may be applied based on the same principle even to a case in which the same TTI length is configured for LP and HP (not limited to this assumption). Further, while it is assumed below that the LP PUCCH is a PUCCH carrying an HARQ-ACK and the HP PUCCH is a PUCCH carrying an HARQ-ACK and/or an SR, the PROPOSALs of the disclosure may be applied based on the same principle even to a case in which the LP/HP PUCCH is a PUCCH carrying any UCI type (e.g., HARQ-ACK, SR, or CSI) (not limited to the above assumption).

Further, when it is said that the LP PUCCH overlaps with the HP PUCCH in time, this may imply that corresponding LP PUCCH resources overlap with corresponding HP PUCCH resource in the same symbol, or the corresponding LP PUCCH resources overlap with an HP sub-slot period including the HP PUCCH resources. For convenience, PUCCH format 0/1/2/3/4 is referred to as PF0/1/2/3/4.

FIG. 8 is a diagram illustrating overlap between LP and HP.

In FIG. 8, (a) may illustrate overlap between one LP PUCCH and two HP PUCCHs, (b)/(c)/(f) may illustrate overlap between one LP PUCCH and one HP PUCCH, and (d)/(e)/(g)/(h) may illustrate no overlap between an LP PUCCH and an HP PUCCH.

In FIG. 8, (a)/(b)/(d)/(f)/(g) may illustrate a case in which an LP PUCCH is not confined to one HP sub-slot (e.g., the LP PUCCH is across a plurality of HP sub-slots), and (c)/(e)/(h) may illustrate a case in which an LP PUCCH is confined to one HP sub-slot.

[Proposal 1]

1) Case 1

A. One LP HARQ-ACK PUCCH may overlap with one or more (a plurality of) HP HARQ-ACK PUCCHs in some cases. The following exemplary specific scheduling may cause the overlap: (a) the UE receives a first PDCCH carrying a first DCI from the BS, wherein i) the first DCI schedules a first PDSCH, ii) the first DCI does not have priority indication information or has a priority indication indicating LP (e.g., 0), and iii) a first PUCCH resource for the first PDSCH is determined based on the first DCI (e.g., a K1 value of FIG. 5); (b) the UE receives second PDCCH(s) carrying second DCI(s) from the BS, wherein iv) the second DCI(s) schedules second PDSCH(s), v) the second DCI(s) includes priority indication information, and the priority indication indicates HP (e.g., 1), and vi) second PUCCH resource(s) for the second PDSCH(s) is determined based on the second DCI(s) (e.g., a K1 value of FIG. 5); and (c) the first PUSCH resource and the second PUCCH resource(s) may at least partially overlap with each other (in the time domain). However, the overlap between the LP HARQ-ACK PUCCH and the HP HARQ-ACK PUCCH may not necessarily be related to dynamic scheduling, and at least one of the LP HARQ-ACK PUCCH or the HP HARQ-ACK PUCCH may be related to a configured grant (e.g., SPS). Further, the overlap between the LP HARQ-ACK PUCCH and the HP HARQ-ACK PUCCH may not necessarily be related to an HARQ-ACK for a PDSCH, and at least one of the LP HARQ-ACK PUCCH or the HP HARQ-ACK PUCCH may be related to reception of a PDCCH (e.g., SPS release). When one LP HARQ-ACK PUCCH overlaps with one or more (a plurality of) HP HARQ-ACK PUCCHs in the above various examples, the following operations may be performed.

i. The LP PUCCH may be multiplexed with a specific one HP PUCCH (referred to as "HP PUCCH #1") among the HP PUCCHs, and an HARQ-ACK of the LP PUCCH may be multiplexed and transmitted on a specific HP PUCCH (referred to as "HP PUCCH #2") in an HP sub-slot including "HP PUCCH #1".

ii. Opt 1

1. HP PUCCH #1 may be determined to be the first (or last) HP PUCCH overlapping with the LP PUCCH or the first (or last) HP PUCCH (overlapping with the LP PUCCH and) satisfying the UE processing timeline (between DL channels (e.g., PDSCHs/PDCCHs) and UL channels (e.g., PUCCHs/PUSCHs) having the same priority (e.g., regarding the same priority) and between DL channels and UL channels having different priorities (e.g., regarding inter-priority)).

And/or HP PUCCH #1 may be determined to be an HP PUCCH (overlapping with the LP PUCCH and) carrying most HP HARQ-ACK bits, and/or an HP PUCCH configured with a PUCCH format (e.g., PF2/3/4 rather than PF0/1) carrying UCI payload with a larger size.

iii. Opt 2

1. HP PUCCH #1 may be determined to be the first (or last) HP PUCCH carrying an HP HARQ-ACK (i.e., dynamic HP HARQ-ACK) corresponding to a PDSCH scheduled by DCI among the HP PUCCH(s) overlapping with the LP PUCCH, or the first (or last) HP PUCCH carrying a dynamic HP HARQ-ACK and satisfying the UE processing time line (regarding the same priority and the inter-priority) (among the HP PUCCH(s) overlapping with the LP PUCCH).

In the absence of any HP PUCCH satisfying the above condition among the HP PUCCH(s) overlapping with the LP PUCCH, Opt 1 may be applied.

iv. HP PUCCH #2 may be determined to be a different PUCCH resource from (or the same PUCCH resource as) HP PUCCH #1 according to the payload size of the HP HARQ-ACK and/or the LP HARQ-ACK.

2) Case 2

A. When one LP HARQ-ACK PUCCH overlaps with one or more (a plurality of) HP SR PUCCHs, the following operations may be performed.

i. Alt 1

1. The LP PUCCH may be multiplexed with a specific one HP PUCCH (referred to as "HP PUCCH #1") among the HP PUCCHs, and an HARQ-ACK of the LP PUCCH may be multiplexed and transmitted (together with an SR of HP PUCCH #1) on a specific HP PUCCH (referred to as "HP PUCCH #2") in an HP sub-slot including "HP PUCCH #1".

The LP PUCCH may include at least PUCCH format 2/3/4.

2. HP PUCCH #1 may be determined to be the first (or last) HP PUCCH overlapping with the LP PUCCH or the first (or last) HP PUCCH (overlapping with the LP PUCCH and) satisfying the UE processing time line (regarding the same priority and the inter-priority).

In this case, in the presence of an HP HARQ-ACK PUCCH overlapping with the LP PUCCH (or an HP sub-slot including the HP HARQ-ACK PUCCH and overlapping with the LP PUCCH), the UE/BS may apply the operation of Case 1 with priority (over the operation of Case 2).

3. HP PUCCH #2 may be determined to be one of a plurality of resources belonging to/configured in a specific HP PUCCH resource set (corresponding to/configured with the payload size of the LP HARQ-ACK or a total UCI payload size calculated by adding the payload size of the LP HARQ-ACK and the payload size of an HP SR corresponding to HP PUCCH #1) (e.g., based on the following methods).

Opt 1: HP PUCCH #2 may be determined to be a PUCCH resource corresponding to a PUCCH resource indicator (PRI) indicated by last DCI (scheduling an LP PDSCH transmission) from among the resources of the HP PUCCH set.

Opt 2: HP PUCCH #2 may be determined to be a PUCCH resource configured for a specific (e.g., lowest) PRI value/state/index from among the resources of the HP PUCCH set.

Opt 3: HP PUCCH #2 may be determined to be a PUCCH resource having the most UCI REs or the largest supportable payload size (according to the number of UCI REs and a max UCI coding rate) (a resource configured for a specific (e.g., lowest) value/state/index among the resources) among the resources of the HP PUCCH set.

ii. Alt 2

1. All of the HP PUCCHs may be multiplexed with the LP PUCCH (referred to as "LP PUCCH #1"), and SRs corresponding to the HP PUCCHs may be multiplexed and transmitted (together with an HARQ-ACK of LP PUCCH #1) on a specific LP PUCCH (referred to as "LP PUCCH #2").

The LP PUCCH may include at least PUCCH format 2/3/4.

In this case, in the presence of an HP HARQ-ACK PUCCH overlapping with the LP PUCCH (or an HP sub-slot including the HP HARQ-ACK PUCCH and overlapping with the LP PUCCH), the UE/BS may apply the operation of Case 1 with priority (over the operation of Case 2).

2. LP PUCCH #2 may be determined to be the same PUCCH resource as (or a different resource from) LP PUCCH #1 according to the payload size of the LP HARQ-ACK and/or the HP SR.

In the case of a part corresponding to an HP SR in total UCI payload configured on LP PUCCH #2, a bitmap may be configured, which indicates positive or negative for each (configuration/index) of a plurality of SRs (rather than a legacy form indicating only a specific one (positive) SR (configuration/index) among the plurality of HP SRs corresponding to the HP PUCCHs).

Alternatively, a bitmap may be configured, which indicates for each occasion of the HP SR PUCCHs whether SR information is positive or negative in the occasion.

3. LP PUCCH #2 may be determined to be one of a plurality of resources belonging to/configured in an LP PUCCH resource set (corresponding to/configured with the payload size of the LP HARQ-ACK or a total UCI payload size calculated by adding the payload size of the LP HARQ-ACK and the payload sizes of the HP SRs corresponding to the HP PUCCHs) (e.g., based on the following methods).

Opt 1: LP PUCCH #2 may be determined to be a PUCCH resource corresponding to a PRI indicated by last DCI (scheduling an LP PDSCH transmission) among the resources of the LP PUCCH set.

Opt 2: When no DCI scheduling an LP PDSCH has been received (e.g., all of received LP PDSCHs are SPS PDSCHs transmitted without scheduling DCI), LP PUCCH #2 may be determined to be a specific SPS PUCCH resource (corresponding to/configured for an LP UCI size or a total UCI payload size calculated by adding the payload sizes of LP UCI and HP UCI) configured for LP.

3) Case 3

A. When one LP PUCCH (e.g., an LP PUCCH carrying an (LP) HARQ-ACK) overlaps with one or more (a plurality of) HP PUCCHs (e.g., HARQ-ACK and/or SR PUCCHs) (including Case 1 and Case 2), the following operations may be performed.

i. The LP PUCCH may be multiplexed with a specific one HP PUCCH (referred to as "HP PUCCH #1") among the HP PUCCHs, and UCI (e.g., an HARQ-ACK) of the LP PUCCH may be multiplexed and transmitted (together with UCI (e.g., an HARQ-ACK and/or an SR) of HP PUCCH #1) on a specific HP PUCCH (referred to as "HP PUCCH #2") in an HP sub-slot including "HP PUCCH #1".

ii. Opt 0

1. In the presence of a specific HP PUCCH (overlapping with the LP PUCCH and) configured/indicated for the first (or last) HP sub-slot overlapping with the LP PUCCH resource in time, HP PUCCH #1 may be determined to be the specific HP PUCCH.

In the absence of an HP PUCCH (overlapping with the LP PUCCH) in the first (or last) HP sub-slot overlapping with the LP PUCCH, the transmission of the LP PUCCH and corresponding LP UCI (e.g., HARQ-ACK) may be dropped.

iii. Opt 1

1. HP PUCCH #1 may be determined to be the first (or last) HP PUCCH overlapping with the LP PUCCH or the first (or last) HP PUCCH (overlapping with the LP PUCCH and) satisfying the UE processing timeline (regarding the same priority and the inter-priority).

In the absence of any HP PUCCH satisfying the above condition among the HP PUCCH(s) overlapping with the LP PUCCH, the transmission of the LP PUCCH and the corresponding LP UCI (e.g., HARQ-ACK) may be dropped.

2. When a repetition transmission is configured/indicated for at least one of the HP PUCCHs, PUCCH #1 may be determined to be the first (or last) HP PUCCH (overlapping with the LP PUCCH) for which repetition is not configured/indicated.

In the absence of any HP PUCCH satisfying the above condition among the HP PUCCH(s) overlapping with the LP PUCCH, HP PUCCH #1 may be determined to be the first (or last) HP PUCCH overlapping with the LP PUCCH.

Alternatively, in the absence of any HP PUCCH satisfying the above condition among the HP PUCCH(s) overlapping with the LP PUCCH, the transmission of the LP PUCCH and the corresponding LP UCI (e.g., HARQ-ACK) may be dropped.

iv. Opt 2

1. HP PUCCH #1 may be determined to be the first (or last) HP PUCCH carrying an HP HARQ-ACK among the HP PUCCH(s) overlapping with the LP PUCCH or the first (or last) HP PUCCH carrying an HP HARQ-ACK and satisfying the UE processing timeline (regarding the same priority and the inter-priority) (among the HP PUCCH(s) overlapping with the LP PUCCH).

In the absence of any HP PUCCH satisfying the above condition among the HP PUCCH(s) overlapping with the LP PUCCH, Opt 1 may be applied.

2. When a repetition transmission is configured/indicated for at least one of the HP PUCCHs, HP PUCCH #1 may be determined to be the first (or last) HP PUCCH carrying an HP HARQ-ACK among HP PUCCH(s) (overlapping with the LP PUCCH) for which repetition is not configured/indicated.

In the absence of any HP PUCCH satisfying the above condition among the HP PUCCH(s) overlapping with the LP PUCCH, HP PUCCH #1 may be determined to be the first (or last) HP PUCCH among the HP PUCCH(s) (overlapping with the LP PUCCH) for which repetition is not configured/indicated.

Alternatively, in the absence of any HP PUCCH satisfying the above condition among the HP PUCCH(s) overlapping with the LP PUCCH, HP PUCCH #1 may be determined to be the first (or last) HP PUCCH overlapping with the LP PUCCH.

Alternatively, in the absence of any HP PUCCH satisfying the above condition among the HP PUCCH(s) overlapping with the LP PUCCH, the transmission of the LP PUCCH and the corresponding LP UCI (e.g., HARQ-ACK) may be dropped.

v. Opt 3

1. HP PUCCH #1 may be determined to be the first (or last) HP PUCCH carrying an HP HARQ-ACK (i.e., a dynamic HP HARQ-ACK) corresponding to reception of a PDSCH scheduled by DCI (or reception of the DCI) among HP PUCCH(s) overlapping with the LP PUCCH or the first (or last) HP PUCCH carrying a dynamic HP HARQ-ACK and satisfying the UE processing timeline (regarding the same priority and the inter-priority) (among the HP PUCCH(s) overlapping with the LP PUCCH).

In the absence of any HP PUCCH satisfying the above condition among the HP PUCCH(s) overlapping with the LP PUCCH, Opt 1 may be applied.

2. When a repetition transmission is configured/indicated for at least one of the HP PUCCHs, HP PUCCH #1 may be determined to be the first (or last) HP PUCCH carrying an HP HARQ-ACK (i.e., a dynamic HP HARQ-ACK) corresponding to reception of a PDSCH scheduled by DCI (or reception of the DCI) among HP PUCCH(s) (overlapping with the LP PUCCH) for which repetition is not configured/indicated.

In the absence of any HP PUCCH satisfying the above condition among the HP PUCCH(s) overlapping with the LP PUCCH, HP PUCCH #1 may be determined to be the first (or last) HP PUCCH (overlapping with the LP PUCCH) for which repetition is not configured/indicated.

Alternatively, in the absence of any HP PUCCH satisfying the above condition among the HP PUCCH(s) overlapping with the LP PUCCH, HP PUCCH #1 may be determined to be the first (or last) HP PUCCH overlapping with the LP PUCCH.

Alternatively, in the absence of any HP PUCCH satisfying the above condition among the HP PUCCH(s) overlapping with the LP PUCCH, the transmission of the LP PUCCH and the corresponding LP UCI (e.g., HARQ-ACK) may be dropped.

vi. HP PUCCH #2 may be determined to be a different PUCCH resource from (or the same PUCCH resource as) HP PUCCH #1 according to the payload size of HP UCI (e.g., HARQ-ACK and/or SR) and/or LP UCI (e.g., HARQ-ACK).

[Proposal 2]

A UL multiplexed transmission operation is proposed for each of (a) a case in which one LP PUSCH overlaps with a plurality of (TDMed) HP PUCCHs (e.g., HP HARQ-ACKs) in time, (b) a case in which one HP PUSCH overlaps with a plurality of (TDMed) LP PUCCHs (e.g., LP HARQ-ACKs) in time, (c) a case in which one LP PUCCH (an LP PUCCH carrying an (LP) HARQ-ACK) overlaps with a plurality of (TDMed) HP PUSCHs in time, and a case in which one HP PUCCH (e.g., HARQ-ACK) overlaps with a plurality of (TDMed) LP PUSCHs in time.

When it is said that an LP PUCCH overlaps with an HP PUSCH in time, this may imply that a corresponding LP PUCCH resource overlaps with a corresponding HP PUSCH resource in the same symbol or the LP PUCCH resource (at least partially) overlaps with an HP slot/sub-slot including the HP PUSCH resource. Further, when it is said that an LP PUSCH overlaps with an HP PUCCH, this may imply that a corresponding LP PUSCH resource overlaps with a corresponding HP PUCCH resource in the same symbol or the LP PUSCH resource (at least partially) overlaps with an HP slot/sub-slot including the HP PUCCH resource.

1) Case 0

A. When simultaneous transmission of a PUCCH and a PUSCH existing in different frequency resources (e.g., frequency bands or cells) and configured/indicated as having different priorities is enabled, and a cell carrying the (HARQ-ACK) PUCCH is changed by a semi-statically configured specific pattern or a dynamic indication of DCI, the UE may not expect a situation in which one LP PUSCH is configured/indicated to overlap with a plurality of (TDMed) HP PUCCHs (e.g., HP PUCCHs including HARQ-ACKs) in time in the same band (or cell) (e.g., this case is considered to be an error case), or when this situation occurs, the UE may drop the LP PUSCH transmission.

i. Accordingly, even though one LP PUSCH overlaps with a plurality of (TDMed) HP PUCCHs (e.g., HP PUCCHs carrying HARQ-ACKs) in time, when only one HP PUCCH (among the plurality of HP PUCCHs) is configured/indicated for the same band as the LP PUSCH, the UE may perform the LP PUSCH transmission (without dropping it) (without considering this case to be an error case).

2) Case 1

A. When one HP PUSCH overlaps with a plurality of LP PUCCHs (e.g., LP PUCCHs carrying (LP) HARQ-ACKs) in time, the UE may operate as follows.

i. LP UCI of a specific one LP PUCCH (referred to as "LP PUCCH #1") among the plurality of LP PUCCHs may be multiplexed on the HP PUSCH, while the remaining LP PUCCH transmissions except for LP PUCCH #1 may be dropped.

ii. Opt 1

1. LP PUCCH #1 may be determined to be the first (or last) LP PUCCH overlapping with the HP PUSCH or the first (or last) LP PUCCH (overlapping with the HP PUSCH and) satisfying the UE processing time line (regarding the same priority and the inter-priority).

In the absence of any LP PUCCH satisfying the above condition among the LP PUCCH(s) overlapping with the HP PUSCH, the transmission of the LP PUCCH and corresponding LP UCI (e.g., HARQ-ACK) may be dropped.

iii. Opt 2

1. LP PUCCH #1 may be determined to be an LP PUCCH having the largest (or smallest) payload size of LP UCI (e.g., HARQ-ACK) among the LP PUCCH(s) overlapping with the HP PUSCH.

When there are a plurality of LP PUCCHs having the largest (or smallest) payload size of LP UCI (e.g., HARQ-ACK), LP PUCCH #1 may be determined to be the first (or last) LP PUCCH in time among the plurality of LP PUCCHs.

iv. When i) one HP (or LP) PUSCH overlaps with ii) one or more LP PUCCHs (e.g., LP PUCCHs carrying (LP) HARQ-ACKs) and iii) a specific PUCCH including both (multiplexed) HP UCI (e.g., HARQ-ACK) and LP UCI (e.g., HARQ-ACK), the UE may multiplex iii) HP UCI and LP UCI of the specific PUCCH on i) the HP (or LP) PUSCH, and drop ii) the remaining LP PUCCH transmissions except for the transmission.

3) Case 2

A. When one LP PUCCH (e.g., an LP PUCCH carrying an (e.g., (LP) HARQ-ACK) overlaps in time with a plurality of HP PUSCHs, the UE may operate as follows.

i. LP UCI of the LP PUSCH may be multiplexed on a specific one HP PUSCH (referred to as "HP PUSCH #1") among the HP PUSCHs.

ii. Opt 1

HP PUSCH #1 may be determined to be the first (or last) HP PUSCH overlapping with the LP PUCCH or the first (or last) HP PUSCH (overlapping with the LP PUCCH and) satisfying the UE processing time line (regarding the same priority and the inter-priority).

In the absence of any HP PUSCH satisfying the above condition among the HP PUSCH(s) overlapping with the LP PUCCH, the transmission of the LP PUCCH and corresponding LP UCI (e.g., HARQ-ACK) may be dropped.

iii. Opt 2

1. HP PUSCH #1 may be determined to be the first (or last) HP PUSCH which is not indicated to carry an aperiodic CSI report among the HP PUSCH(s) overlapping with the LP PUCCH.

When aperiodic CSI reporting is indicated for on all of the HP PUSCHs, Opt 1 may be applied.

iv. Opt 3
1. HP PUSCH #1 may be determined to be an HP PUSCH having the largest (or smallest) beta offset parameter value $\beta_{offset}$ indicated (by DCI) to calculate the number of LP HARQ-ACK mapping REs (on the HP PUSCH) among the HP PUSCH(s) overlapping with the LP PUCCH.

When there are a plurality of HP PUSCHs having the largest (or smallest) beta offset parameter value $\beta_{offset}$ indicated for the LP HARQ-ACK, HP PUSCH #1 may be determined to be the first (or last) HP PUSCH in time among the plurality of HP PUSCHs.

v. Opt 4
1. HP PUSCH #1 may be determined to be the first (or last) HP PUSCH having a non-zero value as $\beta_{offset}$ indicated (by DCI) for the LP HARQ-ACK (on the HP PUSCH) among the HP PUSCH(s) overlapping with the LP PUCCH.

When the value of $\beta_{offset}$ indicated for the LP HARQ-ACK is zero for all of the HP PUSCHs, the UE may drop the LP PUCCH and the corresponding LP HARQ-ACK transmission.

2. (In a further generalization,) when a PUCCH including an LP HARQ-ACK overlaps in time with one or more (a plurality of) HP (or LP) PUSCHs in one or more (a plurality of) carriers/cells, it may be regulated that the UE first selects a PUSCH with a non-zero value as $\beta_{offset}$ indicated (by DCI) for an LP HARQ-ACK from among the HP (or LP) PUSCH (s) (when selecting a PUSCH for UCI multiplexing).

vi. Opt 5
1. HP PUSCH #1 may be determined to be an HP PUSCH having the largest (or smallest) value indicated (by DCI) as the size of LP HARQ-ACK payload (or as the number of LP HARQ-ACK bits) to be multiplexed on the HP PUSCH among the HP PUSCH(s) overlapping with the LP PUCCH.

When there are a plurality of HP PUSCHs having the largest (or smallest) value indicated (by DCI) as the LP HARQ-ACK payload size (or as the number of LP HARQ-ACK bits), HP PUSCH #1 may be determined to be the first (or last) HP PUSCH in time among them.

vii. Opt 6
1. HP PUSCH #1 may be determined to be the first (or last) HP PUSCH having a non-zero value indicated (by DCI) as an LP HARQ-ACK payload size (or as the number of LP HARQ-ACK bits) to be multiplexed on the HP PUSCH among the HP PUSCH(s) overlapping with the LP PUCCH.

When the value indicated as the LP HARQ-ACK payload size (or as the number of LP HARQ-ACK bits) is zero for all of the HP PUSCHs, the UE may drop the LP PUCCH and the corresponding LP HARQ-ACK transmission.

2. (In a further generalization,) when a PUCCH including an LP HARQ-ACK overlaps with a plurality of HP (or LP) PUSCHs in one or more (a plurality of) carriers/cells, it may be regulated that the UE first selects a PUSCH with a non-zero value as an LP HARQ-ACK payload size (or as the number of LP HARQ-ACK bits) (by DCI) from among the HP (or LP) PUSCH(s) (when selecting a PUSCH for UCI multiplexing).

viii. Opt 7
1. (Opt 2/4/6 is generalized to that) HP PUSCH #1 may be determined to be the first (or last) HP PUSCH that does not lead to dropping of LP HARQ-ACK mapping/transmission among the HP PUSCH(s) overlapping with the LP PUCCH.

When the LP HARQ-ACK mapping/transmission should be dropped for all of the HP PUSCHs, the UE may drop the LP PUCCH and the corresponding LP HARQ-ACK transmission.

2. (In a further generalization) when a PUCCH including an LP HARQ-ACK overlaps with one or more (a plurality of) HP (or LP) PUSCHs in time in one or more (a plurality of) carriers/cells, it may be regulated that the UE first selects a PUSCH that does not lead to dropping of LP HARQ-ACK mapping/transmission from among the HP (or LP) PUSCH(s) (when selecting a PUSCH for UCI multiplexing).

4) Case 3
A. When one HP PUCCH (e.g., an HP PUCCH carrying an (HP) HARQ-ACK) overlaps with a plurality of LP PUSCHs in time, the UE may operate as follows.

i. HP UCI of the HP PUCCH may be multiplexed on a specific one LP PUSCH (referred to as "LP PUSCH #1") among the plurality of LP PUSCHs.

ii. Opt 1
1. LP PUSCH #1 may be determined to be the first (or last) LP PUSCH overlapping with the HP PUCCH or the first (or last) LP PUSCH (overlapping with the HP PUCCH and) satisfying the UE processing time line (regarding the same priority and the inter-priority).

In the absence of any LP PUSCH satisfying the above condition among the LP PUSCH(s) overlapping with the HP PUCCH, the transmission of the LP PUSCH may be dropped.

iii. Opt 2
1. LP PUSCH #1 may be determined to be the first (or last) LP PUSCH which is not indicated to carry an aperiodic CSI report (and/or on which a periodic or semi-persistent CSI report is not multiplexed) among the LP PUSCH(s) overlapping with the HP PUCCH.

When aperiodic CSI reporting is indicated for all of the LP PUSCHs (and/or a periodic or semi-persistent CSI report is multiplexed) for all of the LP PUSCHs, Opt 1 may be applied.

iv. Opt 3
1. LP PUSCH #1 may be determined to be an LP PUSCH having the largest (or smallest) beta offset parameter value $\beta_{offset}$ indicated (by DCI) to calculate the number of HP HARQ-ACK mapping REs (on the LP PUSCH) among the LP PUSCH(s) overlapping with the HP PUCCH.

When there are a plurality of LP PUSCHs having the largest (or smallest) beta offset parameter value $\beta_{offset}$ indicated for the HP HARQ-ACK, LP PUSCH #1 may be determined to be the first (or last) LP PUSCH in time among the plurality of LP PUSCHs.

5) Case 4
A. In a situation in which an operation of multiplexing and transmitting UCI of a PUCCH on a PUSCH having a different priority from that of the PUCCH is enabled, the UE may exceptionally perform the following operations in the following Cases.

B. Case 4-1A
i. When a configured grant (CG)-based HP CG PUSCH (and/or an HP DG PUSCH scheduled by DCI that does not include UL DAI information (e.g., total-DAI or payload size information for an HP HARQ-ACK and/or an LP HARQ-ACK) overlaps in time with a specific PUCCH including both (multiplexed) HP UCI (e.g., HARQ-ACK) and LP UCI (e.g., HARQ-ACK) (and the HP CG PUSCH is selected for UCI multiplexing on the PUSCH), the UE may operate as follows.

1. Opt 1
The UE may transmit only the specific PUCCH, while dropping the HP CG PUSCH transmission.

2. Opt 2

The UE may multiplex only the HP UCI (between the HP UCI and the LP UCI included in the specific PUCCH) on the HP CG PUSCH, while dropping the LP UCI transmission.

ii. Note: When an HP DG PUSCH which is based on dynamic (DG) DCI (and scheduled by DCI including UL DAI information (e.g., total-DAI or payload size information for an HP HARQ-ACK and/or an LP HARQ-ACK) overlaps in time with a specific PUCCH including both (multiplexed) HP UCI (e.g., HARQ-ACK) and LP UCI (e.g., HARQ-ACK) (and the HP DG PUSCH is selected for UCI multiplexing on the PUSCH), the UE may multiplex both of the HP UCI and the LP UCI included in the specific PUCCH on the HP DG PUSCH.

C. Case 4-1B i. When a configured grant (CG)-based HP CG PUSCH (and/or an HP DG PUSCH scheduled by DCI that does not UL DAI information (e.g., total-DAI or payload size information for an HP HARQ-ACK and/or an LP HARQ-ACK) overlaps in time with an HP PUCCH (e.g., an HP PUCCH carrying an (HP) HARQ-ACK) and an LP PUCCH (e.g., an LP PUCCH carrying an (LP) HARQ-ACK) (and the HP CG PUSCH is selected for UCI multiplexing on the PUSCH), the UE may operate as follows.

1. Opt 1

The UE may multiplex only HP UCI of the HP PUCCH on the HP CG PUSCH, while dropping the LP PUCCH transmission.

ii. Note: When an HP DG PUSCH which is based on dynamic (DG) DCI (and scheduled by DCI including UL DAI information (e.g., total-DAI or payload size information for an HP HARQ-ACK and/or an LP HARQ-ACK) indication overlaps in time with an HP PUCCH (e.g., an HP PUCCH carrying an (HP) HARQ-ACK) and an LP PUCCH (e.g., an LP PUCCH carrying an (LP) HARQ-ACK) (and the HP DG PUSCH is selected for UCI multiplexing on the PUSCH), the UE may multiplex both of the HP UCI and the LP UCI of the HP PUCCH on the HP DG PUSCH.

D. Case 4-1C i. When a CG-based HP CG PUSCH (and/or an HP DG PUSCH scheduled by DCI that does not include UL DAI information (e.g., total-DAI or payload size information for an HP HARQ-ACK and/or an LP HARQ-ACK) overlaps in time with an LP PUCCH (e.g., an LP PUCCH carrying an (LP) HARQ-ACK) (and the HP CG PUSCH is selected for UCI multiplexing on the PUSCH), the UE may operate as follows.

1. Opt 1

The UE may transmit only the HP CG PUCCH (without UCI multiplexing on the PUSCH), while dropping the LP PUCCH transmission.

ii. Note: When an HP DG PUSCH which is based on DG DCI (and scheduled by DCI including UL DAI information (e.g., total-DAI or payload size information for an HP HARQ-ACK and/or an LP HARQ-ACK) overlaps in time with an LP PUCCH (e.g., an LP PUCCH carrying an (LP) HARQ-ACK) (and the HP DG PUSCH is selected for UCI multiplexing on the PUSCH), the UE may multiplex the LP UCI of the LP PUCCH on the HP DG PUSCH.

E. Ambiguity about HP UL-SCH-related or HP UCI-related rate-matching/RE mapping, which may be caused by misalignment of the payload size of an LP HARQ-ACK (between the UE and the BS) may be prevented by the operations of Case 4-1A, Case 4-1B, and Case 4-1C.

F. Case 4-2A i. When a CG-based LP CG PUSCH (and/or an LP DG PUSCH scheduled by DCI that does not include UL DAI information (e.g., total-DAI or payload size information for an LP HARQ-ACK and/or an HP HARQ-ACK) overlaps in time with a specific PUCCH including both (multiplexed) HP UCI (e.g., HARQ-ACK) and LP UCI (e.g., HARQ-ACK) (and the LP CG PUSCH is selected for UCI multiplexing on the PUSCH), the UE may operate as follows.

I. Opt 1

The UE may transmit only the specific PUCCH, while dropping the LP CG PUCCH transmission.

ii. Note: When a DG-based LP DG PUSCH (scheduled by DCI that includes UL DAI information (e.g., total-DAI or payload size information for an LP HARQ-ACK and/or an HP HARQ-ACK) indication overlaps in time with a specific PUCCH including both (multiplexed) HP UCI (e.g., HARQ-ACK) and LP UCI (e.g., HARQ-ACK) (and the LP DG PUSCH is selected for UCI multiplexing on the PUSCH), the UE may multiplex the HP UCI and the LP UCI included in the specific PUCCH on the LP DG PUSCH.

G. Case 4-2B i. When a CG-based LP CG PUSCH (and/or an LP DG PUSCH scheduled by DCI that does not include UL DAI information (e.g., total-DAI or payload size information for an LP HARQ-ACK and/or an HP HARQ-ACK) indication overlaps in time with an HP PUCCH (e.g., an HP PUCCH carrying an (HP) HARQ-ACK) and an LP PUCCH (e.g., an LP PUCCH carrying an (LP) HARQ-ACK) (and the LP CG PUSCH is selected for UCI multiplexing on a PUSCH), the UE may operate as follows.

I. Opt 1

The UE may drop the LP CG PUSCH transmission.

ii. Note: When a CG-based LP CG PUSCH (and/or an LP DG PUSCH scheduled by DCI that does not include UL DAI information (e.g., total-DAI or payload size information for an LP HARQ-ACK and/or an HP HARQ-ACK) overlaps in time with an HP PUCCH (e.g., an HP PUCCH carrying an (HP) HARQ-ACK) and an LP PUCCH (e.g., an LP PUCCH carrying an (LP) HARQ-ACK) (and the LP CG PUSCH is selected for UCI multiplexing on the PUSCH), the UE may multiplex both the HP UCI of the HP PUCCH and the LP UCI of the LP PUCCH on the LP DG PUSCH.

H. Case 4-2C i. When a CG-based LP CG PUSCH (and/or an LP DG PUSCH scheduled by DCI that does not include UL DAI information (e.g., total-DAI or payload size information for an LP HARQ-ACK and/or an HP HARQ-ACK) overlaps in time with an HP PUCCH (e.g., an HP PUCCH carrying an (HP) HARQ-ACK) (and the LP CG PUSCH is selected for UCI multiplexing on a PUSCH), the UE may operate as follows.

1. Opt 1

The UE may drop the LP CG PUSCH transmission.

ii. Note: When a DG-based LP DG PUSCH (scheduled by DCI that includes UL DAI information (e.g., total-DAI or payload size information for an LP HARQ-ACK and/or an HP HARQ-ACK) indication overlaps in time with an HP PUCCH (e.g., an HP PUCCH carrying an (HP) HARQ-ACK) (and the LP CG PUSCH is selected for UCI multiplexing on the PUSCH), the UE may multiplex the HP UCI of the HP PUCCH on the LP DG PUSCH.

I. Case 4-3A i. When an LP fallback PUSCH scheduled by specific (e.g., fallback) DCI (e.g., DCI format (and/or an LP DG PUSCH scheduled by DCI that does not include the UL DAI information indication) overlaps in time with a specific PUCCH including both (multiplexed) HP UCI (e.g., HARQ-ACK) and LP UCI (e.g., HARQ-ACK) (and the LP fallback PUSCH is selected for UCI multiplexing on the PUSCH), the UE may operate as follows.

1. Opt 1

The UE may transmit only the specific PUCCH, while dropping the LP fallback PUSCH transmission.

ii. Note: When an LP (or HP) non-fallback PUSCH scheduled by another (e.g., non-fallback) DCI (e.g., DCI format 0_1 or 0_2) (scheduled by DCI including the UL DAI information indication) overlaps in time with a specific PUCCH including both (multiplexed) HP UCI (e.g., HARQ-ACK) and LP UCI (e.g., HARQ-ACK) (and the LP (or HP) non-fallback PUSCH is selected for UCI multiplexing on the PUSCH), the UE may multiplex both of the HP UCI and the LP UCI included in the specific PUCCH on the LP (or HP) non-fallback PUSCH.

J. Case 4-3B i. When an LP fallback PUSCH scheduled by specific (e.g., fallback) DCI (e.g., DCI format 0_0 (and/or an LP DG PUSCH scheduled by DCI that does not include the UL DAI information indication) overlaps in time with an HP PUCCH (e.g., an HP PUCCH carrying an (HP) HARQ-ACK) (and/or an LP PUCCH (e.g., an LP PUCCH carrying an (LP) HARQ-ACK)) (and the LP fallback PUSCH is selected for UCI multiplexing on the PUSCH), the UE may operate as follows.

1. Opt 1

The UE may drop the LP fallback PUSCH transmission.

ii. Note: When an LP (or HP) non-fallback PUSCH scheduled by another (e.g., non-fallback) DCI (e.g., DCI format 0_1 or 0_2) (and scheduled by DCI including the UL DAI information indication) overlaps in time with an HP PUCCH (e.g., an HP PUCCH carrying an (HP) HARQ-ACK) (and/or an LP PUCCH (e.g., an LP PUCCH carrying an (LP) HARQ-ACK)) (and the LP fallback PUSCH is selected for UCI multiplexing on the PUSCH), the UE may multiplex the HP UCI of the HP PUCCH (and/or the LP UCI of the LP PUCCH) on the LP (or HP) non-fallback PUSCH.

K. Ambiguity about HP UCI-related rate-matching/RE mapping, which may be caused by misalignment of the payload size of an LP HARQ-ACK (between the UE and the BS), may be prevented by the operations of Case 4-2A, Case 4-2B, Case 4-2C, Case 4-3A, and Case 4-3B.

[Proposal 3]

1) Case A

A. When one LP HARQ-ACK PUCCH (e.g., PUCCH format 0/1) overlaps with at least one HP SR PUCCH (e.g., PUCCH format 0/1), the UE may operate based on at least one of the following "ii. Alt A", "iii. Alt B", and/or "iv. Alt C" according to an embodiment of the disclosure.

i. Background

1. In the case where one HP (positive) SR (e.g., 1 HP PUCCH) overlaps with one LP HARQ-ACK (e.g., 1 LP PUCCH), the following operations may be considered, for example, for each PUCCH format.

2. Combination A: single HP SR PF0+single LP HARQ-ACK PF0

The HARQ-ACK is transmitted in the resource of the single HARQ-ACK PF0 or the resource of the single SR PF0.

(i) In the case of the HARQ-ACK PF0, a corresponding resource (PRB) may include an additional PF0 resource to which a specific PRB offset is applied. In the case of the SR PF0, an additional PF0 resource to which a specific PRB offset is applied may be included in a corresponding resource (PRB index).

3. Combination B: single HP SR PF0+single LP HARQ-ACK PF1

An HARQ-ACK may be transmitted in the resource of the single HARQ-ACK PF1 or the resource of the single SR PF0.

(i) In the case of the single HARQ-ACK PF1, a corresponding resource (PRB) may include an additional PF1 resource to which a specific PRB offset is applied. In the case of the single SR PF0, an additional PF0 resource to which a specific PRB offset is applied may be included in a corresponding resource (PRB index).

Alternatively, only the SR may be transmitted in the single SR PF0, while the HARQ-ACK may be dropped.

4. Combination C: single HP SR PF1+single LP HARQ-ACK PF0

An HARQ-ACK may be transmitted in the resource of the single HARQ-ACK PF0 or the resource of the single SR PF1.

(i) In the case of the HARQ-ACK PF0, a corresponding resource (PRB) may include an additional PF0 resource to which a specific PRB offset is applied.

5. Combination D: single HP SR PF1+single LP HARQ-ACK PF1

An HARQ-ACK may be transmitted in the resource of the single SR PF1.

ii. Alt A

1. When (all or) some of (a)&(b) PF combinations based on (a) one or more HP SR PUCCHs (PF0/1) and (b) an LP HARQ-ACK PUCCH (PF0/1) correspond to a combination that enables transmission of an HARQ-ACK on an SR PUCCH, the UE may multiplex and transmit the LP HARQ-ACK on a specific one (e.g., the first or last) HP SR PUCCH among some corresponding HP SR PUCCHs (or on all of the corresponding HP SR PUCCHs).

2. When none of (a)&(b) PF combinations based on (a) one or more HP SR PUCCHs (PF0/1) and (b) an LP HARQ-ACK PUCCH (PF0/1) correspond to a combination that enables transmission of an HARQ-ACK on an SR PUCCH, the UE may transmit only an HP SR on each HP SR PUCCH, while dropping the LP HARQ-ACK (PUCCH) transmission.

iii. Alt B

1. When all of (a)&(b) PF combinations based on (a) one or more HP SR PUCCHs (PF0/1) and (b) an LP HARQ-ACK PUCCH (PF0/1) correspond to a combination that enables transmission of an HARQ-ACK on an SR PUCCH, the UE may multiplex and transmit the LP HARQ-ACK on a specific (e.g., the first or last) one HP SR PUCCH among all HP SR PUCCHs (or on all of the HP SR PUCCHs).

2. When (any or) some of (a)&(b) PF combinations based on (a) one or more HP SR PUCCHs (PF0/1) and (b) an LP HARQ-ACK PUCCH (PF0/1) do not correspond to a combination that enables transmission of an HARQ-ACK on an SR PUCCH, the UE may transmit t only an HP SR on each HP SR PUCCH, while dropping the LP HARQ-ACK (PUCCH) transmission.

iv. Alt C

1. When an (a)&(b) PF combination based on (a) a specific (e.g., the first or last) HP SR PUCCH (PF0/1) among one or more HP SR PUCCHs (PF01/) and (b) an LP HARQ-ACK PUCCH (PF0/1) corresponds to a combination that enables transmission of an HARQ-ACK on an SR PUCCH, the UE may multiplex and transmit the LP HARQ-ACK on the HP SR PUCCH.

2. When an (a)&(b) PF combination based on (a) a specific (e.g., the first or last) HP SR PUCCH (PF0/1) among one or more HP SR PUCCHs (PF01/) and (b) an LP HARQ-ACK PUCCH (PF0/1) does not correspond to a combination that enables transmission of an HARQ-ACK on an SR PUCCH, the UE may transmit only an HP SR on each HP SR PUCCH, while dropping the LP HARQ-ACK (PUCCH) transmission.

[Proposal 4]

The methods of multiplexing UCI on a PUSCH in NR Rel-15/16 (for convenience, referred to as "Rel-15/16 UCI on PUSCH") are summarized in Table 7 below.

TABLE 7

1. There may be three UCI types, UCI type 1 (e.g., HARQ-ACK), UCI type 2 (e.g., CSI part 1), and UCI type 3 (e.g., CSI part 2), and the UCI may have a higher priority in the order of UCI type 1 > UCI type 2 > UCI type 3.
2. Allocation of the number of REs for each UCI type will be described. Let the total number of REs available for UCI mapping in PUSCH resources be denoted by N.
  ⓐ First for UCI type 1, the number $N_1$ of REs to be mapped to UCI type 1 is calculated based on a UCI payload size and a beta offset '$\beta_{offset}$' (configured/indicated for UCI type 1).
  ⓑ (With N-$N_1$ REs remained) for UCI type 2, the number N2 of REs to be mapped to UCI type 2 is calculated based on a UCI payload size and a beta offset '$\beta_{offset}$' (configured/indicated for UCI type 2).
  ⓒ (With N-$N_1$-$N_2$ REs remained) for UCI type 3, the number $N_2$ of REs to be mapped to UCI type 3 is calculated based on a UCI payload size and a beta offset '$\beta_{offset}$' (configured/indicated for UCI type 3).
3. Next, an RE mapping method for each UCI type may be different according to the payload size of UCI type 1.
  ⓐ When the payload size of UCI type 1 is equal to or less than 2 bits, the following RE mapping method may be applied.
    (i) The UE (sequentially) reserves RE(s) in the earliest non-DMRS symbol after the first DMRS symbol in PUSCH resources, as a reserved RE set corresponding to 2-bit UCI type 1.
    (ii) Subsequently, UCI type 2 and UCI type 3 (and/or a UL-SCH) may be mapped (sequentially), starting from RE(s) in the first non-DMRS symbol of the PUSCH (UCI type 2 may first be mapped, followed by mapping of UCI type 3 and then the UL-SCH. In this case, UCI type 2 may not be mapped to the (pre-scheduled) reserved RE(s) for UCI type 1 (i.e., UCI type 2 may be mapped except for the reserved RE(s)), and UCI type 3 (and/or the UL-SCH) may also be mapped to the reserved RE(s) for UCI type 1.
    (iii) Thereafter, in the absence of actual UCI type 1 (i.e., when UCI type 1 is 0 bits), an additional UCI RE mapping operation may not be performed. On the contrary, in the presence of actual UCI type 1 (i.e., when UCI type 1 is 1 or 2 bits), UCI type 1 may be mapped to the reserved RE(s) for UCI type 1 (by puncturing UCI type 3 and/or the UL-SCH already mapped) (to all or some of the reserved RE(s)).
  ⓑ When the payload size of UCI type 1 is greater than 2 bits, the following RE mapping method may be applied.
    (i) First, the UE may map UCI type 1 (sequentially) to RE(s) in the earliest non-DMRS symbol after the first DMRS symbol in the PUSCH resources.
    (ii) Next, UCI type 2 and UCI type 3 (and/or the UL-SCH) may be mapped (sequentially), starting from RE(s) in the first non-DMRS symbol of the PUSCH (UCI type 2 may first be mapped, followed by mapping of UCI type 3 and then mapping of the UL-SCH). In this case, none of UCI type 2 and UCI type 3 (and/or the UL-SCH) may be mapped to the RE(s) already mapped to UCI type 1 (i.e., all of UCI type 2 and UCI type 3 (and/or the UL-SCH) may be mapped to the remaining REs except for the RE(s) mapped to UCI type 1).

Case H-0) When a UCI combination requiring multiplexed transmission on a PUSCH (e.g., HP PUSCH) is {HP HARQ-ACK, LP HARQ-ACK, HP CSI part 1, HP CSI part 2}, the UE/BS may operate based on Alt 1) or Alt 2).

Alt 1) With the HP CSI part 2 transmission dropped, the RE number allocation and RE mapping methods corresponding to UCI type 1, UCI type 2, and UCI type 3 in "Rel-15/16 UCI on PUSCH" of Table 7 may be applied to the HP HARQ-ACK, the LP HARQ-ACK, and HP CSI part 1, respectively, and the RE number allocation and RE mapping methods corresponding to UCI type 1, UCI type 2, and UCI type 3 in "Rel-15/16 UCI on PUSCH" of Table 7 may be applied to the HP HARQ-ACK, HP CSI part 1, and the LP HARQ-ACK, respectively.

Alt 2) Alternatively, with the LP HARQ-ACK transmission dropped, the RE number allocation and RE mapping methods corresponding to UCI type 1, UCI type 2, and UCI type 3 in "Rel-15/16 UCI on PUSCH" of Table 7 may be applied to the HP HARQ-ACK, HP CSI part 1, and HP CSI part 2, respectively In a more specific example, the BS may configure (by the RRC) or indicate (by DCI) a method to be applied between Alt 1 and Alt 2 for or to the UE, and the UE may perform UCI multiplexing on an HP PUSCH based on the configured method.

Case H-1) When a UCI combination requiring multiplexed transmission on a PUSCH (e.g., an HP PUSCH) is {LP HARQ-ACK, HP CSI part 1, HP CSI part 2} (and an operation of multiplexing and transmitting HP UCI and LP UCI on the same one (HP) PUSCH is configured), the UE may (sequentially) reserve RE(s) of the earliest non-DMRS symbol after the first DMRS symbol in an (HP) PUSCH resource as a reserved RE set corresponding to a 2-bit HP HARQ-ACK in spite of the absence of an HP HARQ-ACK to be actually transmitted (in this case, the number of reserved REs is determined based on a beta offset '$\beta_{offset}$' configured for an HP HARQ-ACK transmission on an HP PUSCH). In this state, the UE may operate based on Alt 1) or Alt 2).

Alt 1) With the HP CSI part 2 transmission dropped, the RE number allocation and RE mapping methods corresponding to UCI type 2 and UCI type 3 in "Rel-15/16 UCI on PUSCH" of Table 7 may be applied to the LP HARQ-ACK, and HP CSI part 1 (or HP CSI part 1 and the LP HARQ-ACK), respectively.

Alt 2) Alternatively, with LP HARQ-ACK transmission dropped, the RE number allocation and RE mapping methods corresponding to UCI type 2 and UCI type 3 in "Rel-15/16 UCI on PUSCH" of Table 7 may be applied to HP CSI part 1 and HP CSI part 2, respectively.

For example, the above method may be applied to UCI multiplexing on any HP PUSCH or only to an HP CG PUSCH or an HP DG PUSCH scheduled by DCI that does not include a UL DAI information (total-DAI or payload size information for an HP HARQ-ACK and/or an LP HARQ-ACK) indication. For an HP DG PUSCH scheduled by DCI that includes the UL DAI information (total-DAI or payload size information for an HP HARQ-ACK and/or an LP HARQ-ACK) indication, Alt 1) the RE number allocation and RE mapping methods corresponding to UCI type 1, UCI type 2, and UCI type 3 in "Rel-15/16 UCI on PUSCH" of Table 7 may be applied to the LP HARQ-ACK, HP CSI part 1, and HP CSI part 2, respectively, or Alt 2) the RE number allocation and RE mapping methods corresponding to UCI type 1, UCI type 2, and UCI type 3 in "Rel-15/16 UCI on PUSCH" of Table 7 may be applied to HP CSI part 1, HP CSI part 2, and the LP HARQ-ACK, respectively.

Case H-2) When a UCI combination requiring multiplexed transmission on an (HP) PUSCH is {LP HARQ-ACK, HP single-part CSI} (and an operation of multiplexing and transmitting HP UCI and LP UCI on the same one (HP) PUSCH is configured), the UE may (sequentially) reserve RE(s) of the earliest non-DMRS symbol after the first DMRS symbol in an HP PUSCH resource as a reserved RE set corresponding to a 2-bit HP HARQ-ACK in spite of the absence of an HP HARQ-ACK to be actually transmitted (in this case, the number of reserved REs is determined based on a beta offset '$\beta_{offset}$' configured for an HP HARQ-ACK transmission on an HP PUSCH). In this state, the UE may operate based on Alt 1) or Alt 2).

Alt 1) The RE number allocation and RE mapping methods corresponding to UCI type 2 and UCI type 3 in "Rel-15/16 UCI on PUSCH" of Table 7 may be applied to the LP HARQ-ACK and the HP CSI, respectively.

Alt 2) Alternatively, the RE number allocation and RE mapping methods corresponding to UCI type 2 and UCI type 3 in "Rel-15/16 UCI on PUSCH" of Table 7 may be applied to the HP CSI and the LP HARQ-ACK, respectively.

For example, the above method may be applied to UCI multiplexing on any HP PUSCH or only to an HP CG PUSCH or an HP DG PUSCH scheduled by DCI that does not include a UL DAI information (total-DAI or payload size information for an HP HARQ-ACK and/or an LP HARQ-ACK) indication. For an HP DG PUSCH scheduled by DCI that includes the UL DAI information (total-DAI or payload size information for an HP HARQ-ACK and/or an LP HARQ-ACK) indication, Alt 1) the RE number allocation and RE mapping methods corresponding to UCI type 1 and UCI type 2 in "Rel-15/16 UCI on PUSCH" of Table 7 may be applied to the LP HARQ-ACK and the HP CSI, respectively, or Alt 2) the RE number allocation and RE mapping methods corresponding to UCI type 1 and UCI type 2 in "Rel-15/16 UCI on PUSCH" of Table 7 may be applied to the HP CSI and an LP HARQ-ACK, respectively.

Case H-3) When UCI requiring multiplexed transmission on an HP PUSCH is only {LP HARQ-ACK} (and an operation of multiplexing and transmitting HP UCI on the same one (HP) PUSCH is configured), the UE may (sequentially) reserve RE(s) of the earliest non-DMRS symbol after the first DMRS symbol in an HP PUSCH resource as a reserved RE set corresponding to a 2-bit HP HARQ-ACK in spite of the absence of an HP HARQ-ACK to be actually transmitted (in this case, the number of reserved REs is determined based on a beta offset '$\beta_{offset}$' configured for an HP HARQ-ACK transmission on an HP PUSCH). In this state, the UE may apply the RE number allocation and RE mapping methods corresponding to UCI type 2 in "Rel-15/16 UCI on PUSCH" of Table 7 to the LP HARQ-ACK.

For example, the above method may be applied to UCI multiplexing on any HP PUSCH or only to an HP CG PUSCH or an HP DG PUSCH scheduled by DCI that does not include a UL DAI information (total-DAI or payload size information for an HP HARQ-ACK and/or an LP HARQ-ACK) indication. For an HP DG PUSCH scheduled by DCI that includes a UL DAI information (total-DAI or payload size information for an HP HARQ-ACK and/or an LP HARQ-ACK) indication, the RE number allocation and RE mapping method corresponding to UCI type 1 in "Rel-15/16 UCI on PUSCH" of Table 7 may be applied to the LP HARQ-ACK.

Table 8 lists at least some (e.g., Case H-x) of the above-described examples of multiplexing UCIs having different priorities on an HP PUSCH

TABLE 8

| CASE | Option | HP UCI Contents | HP UCI UCI type | LP UCI Contents | LP UCI UCI type |
|---|---|---|---|---|---|
| H-0 | Alt. 1 | HARQ-ACK | 1 | HARQ-ACK | 2 |
|  |  | CSI Part 1 | 3 |  |  |
|  |  | CSI Part 2 | (drop) |  |  |
|  | Alt. 2 | HARQ-ACK | 1 | HARQ-ACK | (drop) |
|  |  | CSI Part 1 | 2 |  |  |
|  |  | CSI Part 2 | 3 |  |  |
| H-1 | Alt. 1 | CSI Part 1 | 3 | HARQ-ACK | 2 |
|  |  | CSI Part 2 | (drop) |  |  |
|  | Alt. 2 | CSI Part 1 | 2 | HARQ-ACK | (drop) |
|  |  | CSI Part 2 | 3 |  |  |
| H-2 | Alt. 1 | Single Part CSI | 3 | HARQ-ACK | 2 |
|  | Alt. 2 | Single Part CSI | 2 | HARQ-ACK | 3 |
| H-3 | — | (none) | — | HARQ-ACK | 2 |

Referring to Table 8, when multiplexing of UCIs having different priorities is configured for a PUSCH transmission, RE reservation related to a potential HP HARQ-ACK may be performed on an HP PUSCH even though the HP HARQ-ACK does not actually exist. For example, for both a case in which an actual HP HARQ-ACK of 2 bits or less exists (e.g., CASE H-0) and a case in which an HP HARQ-ACK does not exist (e.g., CASE H-1), RE reservation related to an (actual/potential) 1-bit or 2-bit HP HARQ-ACK or 0-bit HP HARQ-ACK may be performed on the HP PUSCH, and UCI type 2/3 except for UCI type 1 related to the (actual/potential) HP HARQ-ACK may be applied to the remaining UCIs, in terms of an RE number allocation and RE mapping method.

For example, even when there is no HP HARQ-ACK (i.e., 0 bits) to be reported by the UE, the RE reservation related to the potential HP HARQ-ACK may be performed only when the priority of the PUSCH is HP. When the priority of the PUSCH is LP, and the UE determines that an HP HARQ-ACK to be reported is 0 bits, the RE reservation related to the potential HP HARQ-ACK may not be performed on an LP PUSCH.

When RE reservation related to an HARQ-ACK is performed for the HP PUSCH, there is the technical effect that HP data (e.g., a UL-SCH) (and/or HP CSI part 1 and/or HP CSI part 2) mapped to the HP PUSCH is protected. In a specific example, it is assumed that although specific HP DCI scheduling a specific HP PDSCH is transmitted, the UE fails to receive it. As a result of missing the specific HP DCI scheduling the specific HP PDSCH, the UE may misunderstand that the total payload size of the HP HARQ-ACK to be reported for the specific HP PDSCH is 0 bits. While the UE performs resource mapping on the HP PUSCH in this misunderstanding state, the BS may expect the UE to report an N-bit (e.g., 1- or 2-bit) HP HARQ-ACK for the specific HP PDSCH and decode the HP PUSCH. When specific REs are configured as reserved REs related to an HP HARQ-ACK on the HP PUSCH despite the UE's wrong determination of the payload size of the HP HARQ-ACK to be 0 bits, the UE/BS operates based on Table 7 above (e.g., the UE maps CSI part 2 and data (e.g., an HP UL-SCH) after mapping CSI part 1 by avoiding the reserved specific REs). The BS decodes CSI part 2 and the data (e.g., the HP UL-SCH) in the remaining REs, assuming that the reserved REs have been punctured (e.g., Table 7-based operation) for the HP HARQ-ACK. In addition, the BS may identify that the UE has failed in correctly receiving the PDSCH scheduling based on non-detection of an ACK in the reserved specific REs, and perform retransmission (if necessary).

A description will be given of a problem when reserved REs related to an HP HARQ-ACK are configured in an HP PUSCH only based on a UE's determination that a 1- or 2-bit HP HARQ-ACK actually exists, compared to this embodiment. If the UE misidentifies that the payload size of an HP HARQ-ACK is 0 bits, the UE maps CSI part 1/2 and data (e.g., an HP UL-SCH) without reserving specific REs. However, since the BS decodes the HP PUSCH on the assumption of 1- or 2-bit A/N mapping to the specific REs, the reception performance of the HP PUSCH including CSI part 1/2 and HP UL-SCH data is degraded.

Although this PUSCH reception performance degradation is acceptable for an LP PUSCH (carrying LP CSI part 1/LP CSI part 2/a n LP UL-SCH), it is preferably not allowed for an HP PUSCH (carrying HP CSI part 1/HP CSI part2/a HP UL-SCH) requiring relatively high importance and reliability. Therefore, RE reservation may be performed for the LP PUSCH only based on the UE's determination that a valid 1- or 2-bit HP HARQ-ACK exists on the LP PUSCH, to increase the efficiency of resource use, whereas the UE performs RE reservation related to a potential 1- or 2-bit HP HARQ-ACK in spite of a determination of the absence of an actual HP HARQ-ACK on the HP PUSCH, to protect HP and increase reliability.

When an HP HARQ-ACK exists and its size exceeds 2 bits, rate matching is performed for a PUSCH in consideration of an HP HARQ-ACK payload size rather than RE reservation for an HP HARQ-ACK. Therefore, HP PUSCH performance degradation does not matter.

In an example of allowing LP PUSCH performance degradation caused by not performing reservation for a potential HP HARQ-ACK, when the UE determines that HP HARQ-ACK is 0 bits and multiplexes {LP HARQ-ACK, LP CSI part 1, LP CSI part 2} on an LP PUSCH, the UE does not perform RE reservation for a potential HP HARQ-ACK. When the UE misses HP DCI and thus skips reporting an HP HARQ-ACK of 2 bits or less, the reception performance of the LP PUSCH may be degraded more or less. However, this reception performance may be allowed for LP with relatively low importance and a low protection level (for the efficiency of resource use).

In the above description, HP CSI part 1 and HP CSI part 2 may correspond to aperiodic CSI. For example, aperiodic HP CSI reporting may be triggered by DCI, and HP CSI part 1 and HP CSI part 2 may be transmitted on an HP PUSCH scheduled by the DCI.

While it is possible to transmit CSI part 1 and CSI part 2 on a PUSCH with the same priority, transmission of CSI part 1 and CSI part 2 on a PUSCH with a different priority may not be allowed. For example, (aperiodic) HP CSI part 1/2 may be transmitted only on the HP PUSCH, not on the LP PUSCH, and when (periodic) LP CSI part 1/2 overlaps with the HP PUSCH, (periodic) LP CSI part 1/2 may be dropped.

Figure 9:
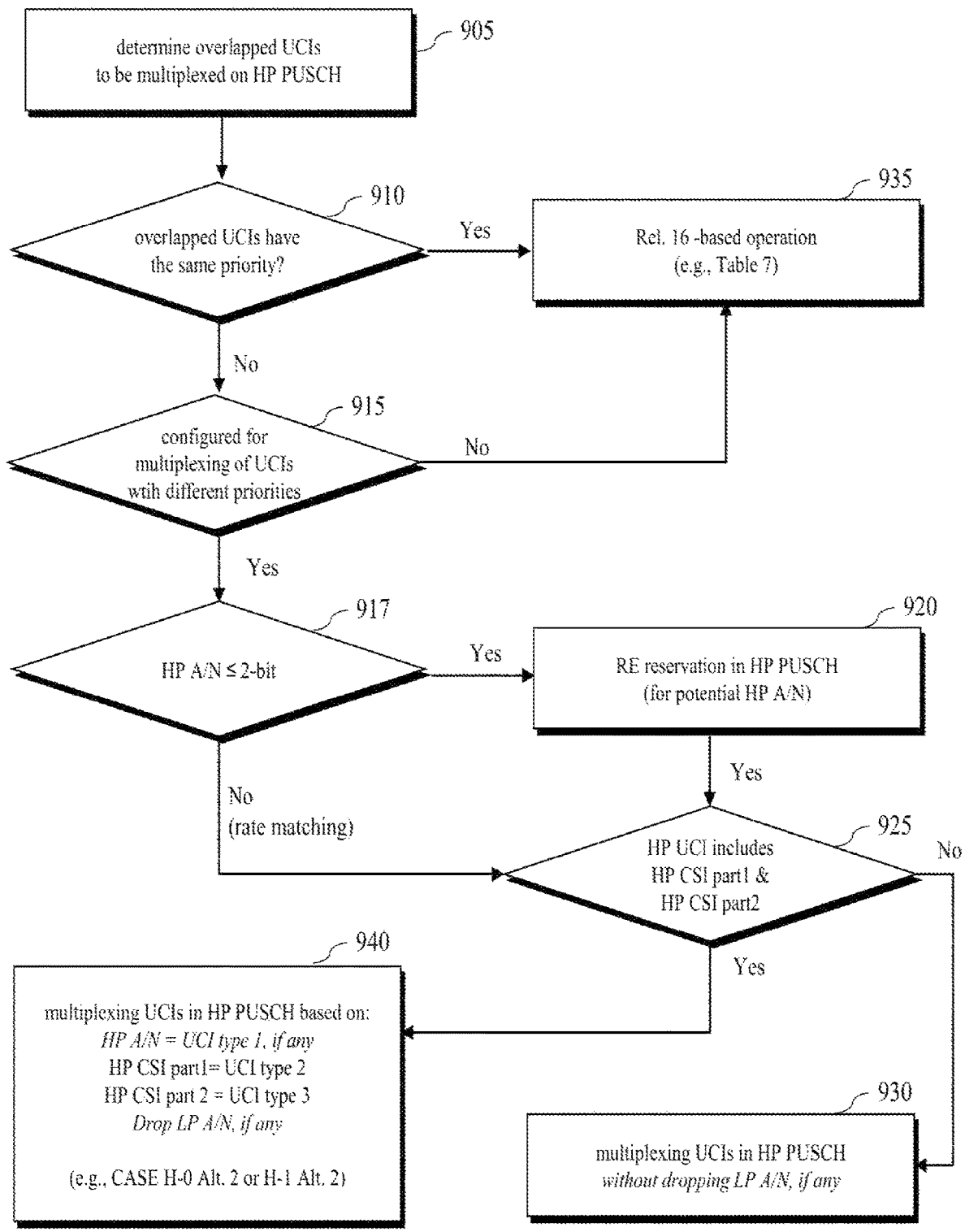
FIGS. 9, 10 and 11 are diagrams illustrating uplink control information (UCI) multiplexing according to an embodiment of the disclosure.

Those skilled in the art will understand that although Alt.1 and Alt.2 are optional in the same CASE H-x, they do not conflict (they are compatible) in different CASE H-x and CASE H-y (e.g., FIG. 9).

FIG. 9 is a diagram illustrating multiplexing of UCIs with different priorities on an HP PUSCH according to an embodiment of the disclosure. An operation of a UE/BS to which at least CASE H-0 and CASE H-1 are applied is illustrated in FIG. 9.

Referring to FIG. 9, the UE/BS determines UCIs to be multiplexed on an HP PUSCH (905), and determines whether the UCIs have the same priority (910). In the case of the same priority, the UE/BS may operate in the same manner as in legacy NR Rel. 16 (935). In the case of different priorities, the UE needs to determine whether the BS has configured multiplexing of UCIs with different priorities on a PUSCH (915). When the UE is not configured with multiplexing of UCIs with different priorities on a PUSCH, the UE may operate in the same manner as in legacy NR Rel. 16 (935).

For convenience, it is assumed that the UE is configured with multiplexing of UCIs with different priorities on a PUSCH (915, yes). When an HP HARQ-ACK is larger than 2 bits (917, no), rate matching is performed for the HP PUSCH in consideration of the payload size of the HP HARQ-ACK. When the HP HARQ-ACK is 0, 1, or 2 bits (917, yes), RE reservation is performed for the HP HARQ-ACK on the HP PUSCH (920).

When HP UCI includes HP CSI part 1/2 (925, yes), HP CSI part 1 and HP CSI part 2 are considered as UCI type 2 and UCI type 3, respectively in Table 7, and mapped on the PUSCH. In the presence of an LP HARQ-ACK, the LP HARQ-ACK is dropped (940).

When the HP UCI does not include HP CSI part 1/2 (925, No) and the LP HARQ-ACK is mappable, the LP HARQ-ACK may be transmitted on the HP PUSCH (930).

Case L-0) When a UCI combination requiring multiplexed transmission on an LP PUSCH is {HP HARQ-ACK, LP HARQ-ACK, LP CSI part 1, LP CSI part 2}, the RE number allocation and RE mapping methods corresponding to UCI type 1, UCI type 2, and UCI type 3 in "Rel-15/16 UCI on PUSCH" of Table 7 may be applied to the HP HARQ-ACK, the LP HARQ-ACK, LP CSI part 1, respectively, while the transmission of LP CSI part 2 may be dropped.

Figure 10:
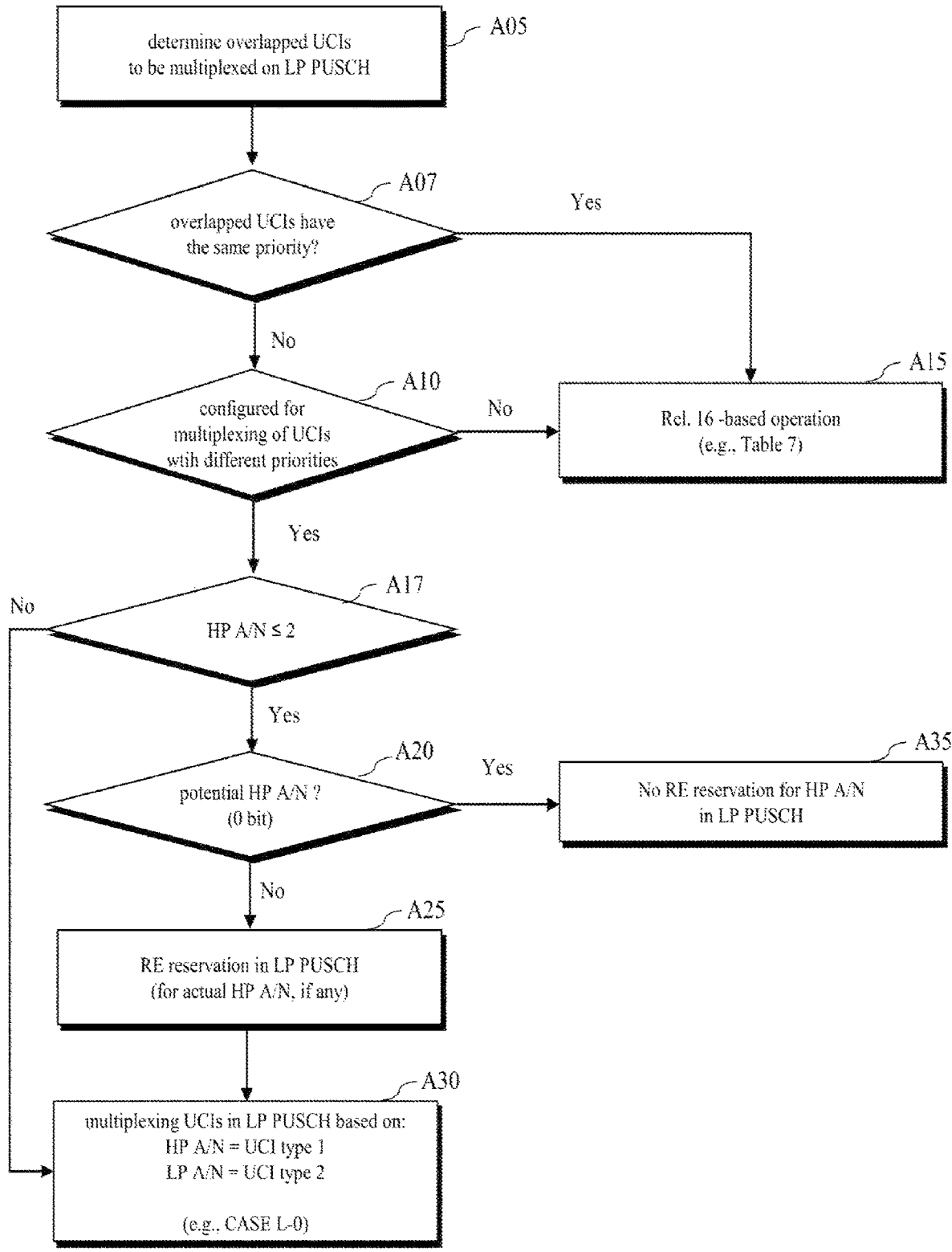

FIG. 10 is a diagram illustrating multiplexing of UCIs with different priorities on an LP PUSCH according to an embodiment of the disclosure. A UE/BS operation to which at least CASE L-0 is applied is illustrated in FIG. 10.

Referring to FIG. 10, the UE/BS determines UCIs to be multiplexed on an LP PUSCH (A05), and determines whether the UCIs have the same priority (A07). In the case of the same priority, the UE/BS may operate in the same manner as in legacy NR Rel. 16 (A15). In the case of different priorities, the UE needs to determine whether the BS has configured multiplexing of UCIs with different priorities on a PUSCH (A10). When the UE is not configured with multiplexing of UCIs with different priorities on a PUSCH, the UE may operate in the same manner as in legacy NR Rel. 16 (A15).

For convenience, it is assumed that the UE is configured with multiplexing of UCIs with different priorities on a PUSCH (A10, yes). When an HP HARQ-ACK is larger than 2 bits (A17, no), rate matching is performed for the HP PUSCH in consideration of the payload size of the HP HARQ-ACK. When the HP HARQ-ACK is (equal to or larger than 1 bit and) equal to or smaller than 2 bits, RE reservation is performed for the HP HARQ-ACK on the LP PUSCH (A25). When the HP HARQ-ACK is 0 bits, RE reservation is not performed for a potential HP HARQ-ACK on the LP PUSCH (A35).

In CASE L-0, the HP HARQ-ACK may be considered to be UCI type 1, and the LP HARQ-ACK may be considered to be UCI type 2, on the LP-PUSCH (A30).

Case L-1) When a UCI combination requiring multiplexed transmission on an LP PUSCH is {LP HARQ-ACK, LP CSI part 1, LP CSI part 2}, (and when an operation of multiplexing and transmitting HP UCI and LP UCI on the same one (LP) PUSCH is configured) the UE may (sequentially) reserve RE(s) in the earliest non-DMRS symbol after the first DMRS symbol in an LP PUSCH resource as a reserved RE set corresponding to a 2-bit HP HARQ-ACK, in spite of the absence of an actual HP HARQ-ACK to be transmitted (in this case, the number of reserved REs may be determined based on a beta offset '$\beta_{offset}$' configured for transmission of an HP HARQ-ACK on an LP PUSCH). In this case, the UE may apply the RE number allocation and RE mapping methods corresponding to UCI type 2, and UCI type 3 in "Rel-15/16 UCI on PUSCH" of Table 7 to the LP HARQ-ACK and LP CSI part 1, respectively, while dropping the transmission of LP CSI part 2.

Case L-2) When a UCI combination requiring multiplexed transmission on an LP PUSCH is {LP HARQ-ACK, LP single-part CSI}, (and when an operation of multiplexing and transmitting HP UCI and LP UCI on the same one (LP) PUSCH is configured) the UE may (sequentially) reserve RE(s) in the earliest non-DMRS symbol after the first DMRS symbol in an LP PUSCH resource as a reserved RE set corresponding to a 2-bit HP HARQ-ACK, in spite of the absence of an actual HP HARQ-ACK to be transmitted (in this case, the number of reserved REs may be determined based on a beta offset '$\beta_{offset}$' configured for transmission of an HP HARQ-ACK on an LP PUSCH). In this case, the UE may apply the RE number allocation and RE mapping methods corresponding to UCI type 2 and UCI type 3 in "Rel-15/16 UCI on PUSCH" of Table 7 to the LP HARQ-ACK and the LP CSI, respectively.

Case L-3) When UCI requiring multiplexed transmission on an LP PUSCH is only {LP HARQ-ACK}, (and when an operation of multiplexing and transmitting HP UCI and LP UCI on the same on (LP) PUSCH is configured) the UE may (sequentially) reserve RE(s) in the earliest non-DMRS symbol after the first DMRS symbol in an LP PUSCH resource as a reserved RE set corresponding to a 2-bit HP HARQ-ACK, in spite of the absence of an actual HP HARQ-ACK to be transmitted (in this case, the number of reserved REs may be determined based on a beta offset '$\beta_{offset}$' configured for transmission of an HP HARQ-ACK on an LP PUSCH). In this case, the UE may apply the RE number allocation and RE mapping method corresponding to UCI type 2 in "Rel-15/16 UCI on PUSCH" of Table 7 to the LP HARQ-ACK.

Table 9 summarizes at least some (e.g., Case L-x) of the above-described examples of multiplexing UCIs with different priorities on an LP PUSCH.

TABLE 9

| CASE | HP UCI Contents | HP UCI type | UP UCI Contents | UP UCI type |
|------|-----------------|-------------|-----------------|-------------|
| L-0 | HARQ-ACK | 1 | HARQ-ACK | 2 |
|  |  |  | CSI Part 1 | 3 |
|  |  |  | CSI Part 2 | (drop) |
| L-1 | (none) | — | HARQ-ACK | 2 |
|  |  |  | CSI Part 1 | 3 |
|  |  |  | CSI Part 2 | (drop) |
| L-2 | (none) | — | HARQ-ACK | 2 |
|  |  |  | Single Part CSI | 3 |
| L-3 | (none) | — | HARQ-ACK | 2 |

Figure 11:
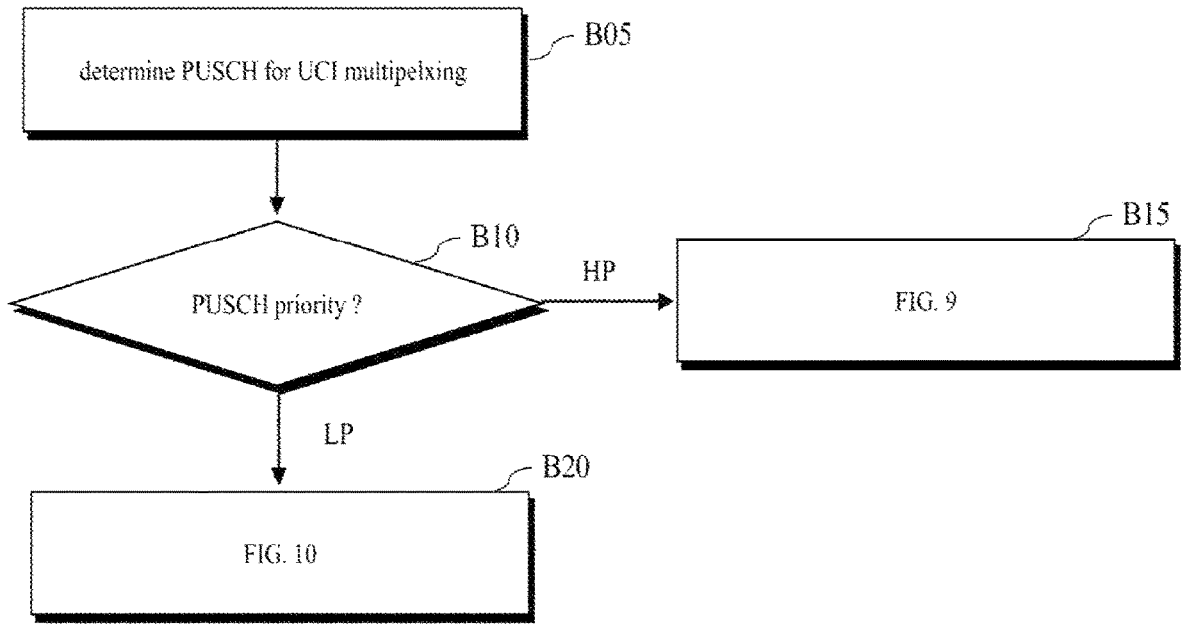

Table 8 and Table 9 do not conflict with each other, and the UE/BS may support both part of Table 8 and part of Table 9. For example, referring to FIG. 11, depending on whether a PUSCH B05 determined for UCI multiplexing is HP or LP (B10), the UE/BS may operate as in FIG. 9 implementing part of Table 8 (B15) or the UE/BS may operate as in FIG. 10 implementing part of Table 9 (B20).

When a UCI combination requiring multiplexed transmission on an LP PUSCH is {HP HARQ-ACK, HP single-part CSI, LP HARQ-ACK}, the UE may apply the RE number allocation and RE mapping methods corresponding to UCI type 1, UCI type 2, and UCI type 3 in "Rel-15/16 UCI on PUSCH" of Table 7 to the HP HARQ-ACK, the HP single-part CSI, and the LP HARQ-ACK, respectively.

In this case, when the HP PUSCH includes a UL-SCH transmission, and the number (e.g., N) of the remaining REs after the HP HARQ-ACK and the HP single-part CSI are mapped among total UCI REs available for UCI mapping on the HP PUSCH is less than a specific number (e.g., X) of REs (corresponding to a minimum number of REs required for LP HARQ-ACK mapping), the UE may 1) drop the transmission of the whole LP HARQ-ACK or 2) map coded bits of the whole payload of the LP HARQ-ACK to N REs, for transmission, even though N is less than X. Herein, X may be determined (e.g., to be the smallest integer equal to or larger than {A×B×C/D} based on a combination of the payload size (e.g., A) of the LP HARQ-ACK (including a CRC), a $\beta_{offset}$ value (e.g., B) configured for the LP HARQ-ACK, a total number (e.g., C) of REs available for data mapping on the HP PUSCH, and the TB size (e.g., D) of the UL-SCH.

In another method, the UE may 3) map only some specific HARQ-ACK bits (e.g., having the bit index) (which satisfies (e.g., equal to or lower than) a specific code rate (e.g., {D/(B×C)}) based on the $\beta_{offset}$ for the LP HARQ-ACK and is mappable to the N REs as much as possible) to the N REs in the total LP HARQ-ACK payload, for transmission.

Alternatively in this case, when the HP PUSCH does not include a UL-SCH transmission, and mapping of the LP HARQ-ACK to the remaining (N) REs after mapping of the HP HARQ-ACK and the HP single-part CSI among the total UCI REs available for UCI mapping on the HP PUSCH leads to a coding rate (e.g., M) of the LP HARQ-ACK higher than a specific level (e.g., Y), 1) the UE may drop the transmission of the whole LP HARQ-ACK (in this case, the N REs may be additionally used for mapping the HP single-part CSI), or 2) even though M is larger than Y, the UE may map the coded bits of the whole payload of the LP HARQ-ACK to the N REs, for transmission. Y may be determined (e.g., to be {R/B}) based on a combination of a coding rate (e.g., R) indicated by DCI scheduling the HP PUSCH and the $\beta_{offset}$ value (e.g., B) configured for the LP HARQ-ACK.

In another method, the UE may 3) map only some specific HARQ-ACK bits (e.g., having the bit index) (which satisfies (e.g., equal to or lower than) a specific code rate (e.g., {R/B}) based on the $\beta_{offset}$ for the LP HARQ-ACK and is mappable to the N REs as much as possible) to the N REs in the total LP HARQ-ACK payload, for transmission.

When a UCI combination requiring multiplexed transmission on an HP PUSCH is {HP CSI part 1, HP CSI part 2, LP HARQ-ACK}, the UE may apply the RE number allocation and RE mapping methods corresponding to UCI type 1, UCI type 2, and UCI type 3 in "Rel-15/16 UCI on PUSCH" of Table 7 to HP CSI part 1, HP CSI part 2, and the LP HARQ-ACK, respectively.

In this case, when the HP PUSCH includes a UL-SCH transmission, and the number (e.g., N) of the remaining REs after HP CSI part 1 and HP CSI part 2 are mapped among total UCI REs available for UCI mapping on the HP PUSCH is less than a specific number (e.g., X) of REs (corresponding to a minimum number of REs required for LP HARQ-ACK mapping), the UE may 1) drop the transmission of the whole LP HARQ-ACK or 2) map coded bits of the whole payload of the LP HARQ-ACK to N REs, for transmission, even though N is less than X. Herein, X may be determined (e.g., to be the smallest integer equal to or larger than {A×B×C/D}) based on a combination of the payload size (e.g., A) of the LP HARQ-ACK (including a CRC), a $\beta_{offset}$ value (e.g., B) configured for the LP HARQ-ACK, a total number (e.g., C) of REs available for data mapping on the HP-PUSCH, and the TB size (e.g., D) of the UL-SCH.

In another method, the UE may 3) map only some specific HARQ-ACK bits (e.g., having the bit index) (which satisfies (e.g., equal to or lower than) a specific code rate (e.g., {D/(B×C)}) based on the $\beta_{offset}$ for the LP HARQ-ACK and is mappable to the N REs as much as possible) to the N REs in the total LP HARQ-ACK payload, for transmission.

Alternatively in this case, when the HP PUSCH does not include a UL-SCH transmission, and mapping of the LP HARQ-ACK to the remaining (N) REs after mapping HP CSI part 1 and HP CSI part 2 among the total UCI REs available for UCI mapping on the HP PUSCH leads to the coding rate (e.g., M) of the LP HARQ-ACK higher than a specific level (e.g., Y), 1) the UE may drop the transmission of the whole LP HARQ-ACK (in this case, the N REs may be additionally used for mapping the HP CSI part 2), or 2) even though M is larger than Y, the UE may map the coded bits of the whole payload of the LP HARQ-ACK to the N REs, for transmission. Y may be determined (e.g., to be {R/B}) based on a combination of a coding rate (e.g., R) indicated by DCI scheduling the HP PUSCH and the $\beta_{offset}$ value (e.g., B) configured for the LP HARQ-ACK.

In another method, the UE may 3) map only some specific HARQ-ACK bits (e.g., having the bit index) (which satisfies (e.g., equal to or lower than) a specific code rate (e.g., {R/B}) based on the $\beta_{offset}$ for the LP HARQ-ACK and is mappable to the N REs as much as possible) to the N REs in the total LP HARQ-ACK payload, for transmission.

When a UCI combination requiring multiplexed transmission on an LP PUSCH is {HP HARQ-ACK, LP HARQ-ACK, LP CSI part 1, LP CSI part 2}, the UE may apply the RE number allocation and RE mapping methods corresponding to UCI type 1, UCI type 2, and UCI type 3 in "Rel-15/16 UCI on PUSCH" of Table 7 to the HP HARQ-ACK, the LP HARQ-ACK, and LP CSI part 1, respectively, while dropping the LP CSI part 2 transmission.

In this case, when the LP PUSCH includes a UL-SCH transmission, and the number (e.g., N) of the remaining REs after the HP HARQ-ACK and the LP HARQ-ACK are mapped among total UCI REs available for UCI mapping on the LP PUSCH is less than a specific number (e.g., X) of REs (corresponding to a minimum number of REs required for LP CSI part 1 mapping), the UE may 1) drop the transmission of whole LP CSI part 1 or 2) map coded bits of the whole payload of LP CSI part 1 to N REs, for transmission, even though N is less than X. Herein, X may be determined (e.g., to be the smallest integer equal to or larger than {A×B×C/D}) based on a combination of the payload size (e.g., A) of LP CSI part 1 (including a CRC), a $\beta_{offset}$ value (e.g., B) configured for LP CSI part 1, a total number (e.g., C) of REs available for data mapping on the LP-PUSCH, and the TB size (e.g., D) of the UL-SCH.

In another method, the UE may 3) map only some specific CSI bits (e.g., having the bit index) (which satisfies (e.g., equal to or lower than) a specific code rate (e.g., {D/(B×C)}) based on the $\beta_{offset}$ value configured for LP CSI part 1 and is mappable to the N REs as much as possible) to the N REs in the total LP CSI part 1 payload, for transmission.

Alternatively in this case, when the LP PUSCH does not include a UL-SCH transmission, and mapping of LP CSI part 1 to the remaining (N) REs after mapping of the HP HARQ-ACK and the LP HARQ-ACK among the total UCI REs available for UCI mapping on the LP PUSCH leads to a coding rate (e.g., M) of HP CSI part 1 higher than a specific level (e.g., Y), 1) the UE may drop the transmission of whole LP CSI part 1 (in this case, the N REs may be additionally used for mapping the LP HARQ-ACK), or 2) even though M is larger than Y, the UE may map the coded bits of the whole payload of LP CSI part 1 to the N REs, for transmission. Y may be determined (e.g., to be {R/B}) based on a combination of a coding rate (e.g., R) indicated by DCI scheduling the LP PUSCH and a $\beta_{offset}$ value (e.g., B) configured for LP CSI part 1.

In another method, the UE may 3) map only some specific CSI bits (e.g., having the bit index), which satisfies (e.g., equal to or lower than) a specific code rate (e.g., {R/B}) based on the $\beta_{offset}$ configured for LP CSI part 1 (and is mappable to the N REs as much as possible), to the N REs in the total LP CSI part 1 payload, for transmission.

When a UCI combination requiring multiplexed transmission on an LP PUSCH is {HP HARQ-ACK, LP HARQ-ACK, LP single-part CSI}, the UE may apply the RE number allocation and RE mapping methods corresponding to UCI type 1, UCI type 2, and UCI type 3 in "Rel-15/16 UCI on PUSCH" of Table 7 to the HP HARQ-ACK, the LP HARQ-ACK, and the LP single-part CSI, respectively.

In this case, when the LP PUSCH includes a UL-SCH transmission, and the number (e.g., N) of the remaining REs after the HP HARQ-ACK and the LP HARQ-ACK are mapped among total UCI REs available for UCI mapping on the LP PUSCH is less than a specific number (e.g., X) of REs (corresponding to a minimum number of REs required for LP single-part CSI mapping), the UE may 1) drop the transmission of the whole LP single-part CSI or 2) map coded bits of the whole payload of the LP single-part CSI to the N REs, for transmission, even though N is less than X. Herein, X may be determined (e.g., to be the smallest integer equal to or larger than {A×B×C/D}) based on a combination of the payload size (e.g., A) of the LP single-part CSI (including a CRC), a $\beta_{offset}$ value (e.g., B) configured for the LP single-part CSI, a total number (e.g., C) of REs available for data mapping on the LP-PUSCH, and the TB size (e.g., D) of the UL-SCH.

In another method, the UE may 3) map only some specific CSI bits (e.g., having the bit index), which satisfies (e.g., equal to or lower than) a specific code rate (e.g., {D/(B×C)}) based on a $\beta_{offset}$ value configured for the LP single-part CSI (or LP CSI part 1) and is mappable to the N REs as much as possible), to the N REs in the total LP single-part CSI payload, for transmission.

Alternatively in this case, when the LP PUSCH does not include a UL-SCH transmission, and mapping of the LP single-part CSI to the remaining (N) REs after mapping of the HP HARQ-ACK and the LP HARQ-ACK among the total UCI REs available for UCI mapping on the LP PUSCH leads to a coding rate (e.g., M) of the LP single-part CSI higher than a specific level (e.g., Y), 1) the UE may drop the transmission of the whole LP single-part CSI (in this case, the N REs may be additionally used for mapping the LP HARQ-ACK), or 2) even though M is larger than Y, the UE may map the coded bits of the whole payload of the LP single-part CSI to the N REs, for transmission. Y may be determined (to be (e.g., {R/B}) based on a combination of a coding rate (e.g., R) indicated by DCI scheduling the LP PUSCH and a $\beta_{offset}$ value (e.g., B) configured for the LP single-part CSI (or LP CSI part 1).

In another method, the UE may 3) map only some specific CSI bits (e.g., having the bit index), which satisfies (e.g., equal to or lower than) a specific code rate (e.g., {R/B})

based on a $\beta_{offset}$ configured for the LP single-part CSI (or LP CSI part 1) and is mappable to the N REs as much as possible), to the N REs in the total LP single-part CSI payload, for transmission.

[Proposal 5-1]

In a situation in which simultaneous transmission of a PUCCH and a PUSCH which are located in different frequency resources (e.g., frequency bands (or cells)) and configured/indicated as having different priorities is enabled, the following operations may be considered. In the following description, XP may represent a specific priority, and YP may represent a different priority from XP. For example, when XP=HP, YP=LP. In another example, when XP=LP, YP=HP.

1) When a PUCCH on which HP UCI and LP UCI are multiplexed and an HP PUCCH or LP PUCCH are located in different bands (or cells) and overlap with each other in time, the following operations may be performed.

A. Alt 1: Because the priority of at least one UCI multiplexed on the PUCCH is different from the priority of the PUSCH, the UE may operate to simultaneously transmit the PUCCH and the PUSCH.

i. Regarding the PUCCH and the PUSCH located in different bands (or cells) and overlapping with each other in time, when the priorities of all UCIs on the PUCCH are the same as the priority of the PUSCH, the simultaneous transmission of the PUCCH and the PUSCH is not allowed. In this case, the UE may multiplex and transmit the UCIs of the PUCCH on the PUSCH.

B. Alt 2: Because the priority of at least one UCI multiplexed on the PUCCH is equal to the priority of the PUSCH, the simultaneous transmission of the PUCCH and the PUSCH is not allowed. In this case, the UE may multiplex and transmit the HP UCI and the LP UCI of the PUCCH on the PUSCH.

i. That is, regarding the PUCCH and the PUSCH located in different bands (or cells) and overlapping with each other in time, only when the priorities of all UCIs on the PUCCH are different from the priority of the PUSCH, the UE may operate to simultaneously transmit the PUCCH and the PUSCH.

2) When an XP PUCCH carrying XP UCI and at least one (inter-band) YP PUSCH are located in different frequency resources (bands (or cells)) and overlap with each other in time (e.g., over at least some time resources), and the XP PUCCH and at least one (intra-band) YP PUSCH are located in the same band (or cell) and overlap with each other in time, the UE may operate as follows.

A. Case 1: When an operation of multiplexing the XP PUCCH and the YP PUSCH configured/indicated as having different priorities (e.g., multiplexing the XP UCI on the YP PUSCH) is enabled, the following operations may be performed.

i. Opt 1: One YP PUSCH may be selected by applying a specific rule to all of the intra-band YP PUSCH and the inter-band YP PUSCH(s), and the XP UCI of the XP PUCCH may be multiplexed and transmitted on the selected YP PUSCH.

ii. Opt 2: One YP PUSCH may be selected by applying a specific rule only to the intra-band YP PUSCH(s), and the XP UCI of the XP PUCCH may be multiplexed and transmitted on the selected YP PUSCH.

B. Case 2: When an operation of multiplexing the XP PUCCH and the YP PUSCH configured/indicated as having different priorities (e.g., multiplexing the XP UCI on the YP PUSCH) is disabled, the following operations may be performed.

i. When XP is a higher priority than YP, only the XP PUCCH may be transmitted, while the transmissions of the intra-band YP PUSCH and the inter-band YP PUSCH may all be dropped. When XP is a lower priority than YP, only the intra-band YP PUSCH and the inter-band YP PUSCH may be transmitted, while the transmission of the XP PUCCH may be dropped.

C. Note: When the XP PUCCH overlaps with at least one intra-band YP PUSCH in time, simultaneous transmission between the XP PUCCH and every YP PUSCH may not be allowed (in this case, Case 1 or Case 2 may be applied), and when the XP PUCCH overlaps only with inter-band YP PUSCH(s) in time, the XP PUCCH and the inter-band YP PUSCH(s) may be simultaneously transmitted.

[Proposal 5-2]

When an HP (SPS) PUCCH carrying an HP (SPS) HARQ-ACK for reception of an SPS PDSCH overlaps in time with an LP PUCCH carrying an LP HARQ-ACK (e.g., an HP PUCCH time resource and an LP PUCCH time resource overlap at least partially with each other) in a situation in which multiplexed transmission of PUCCHs having different priorities is enabled, the following UE operations may be considered.

1) When the HP SPS PUCCH is configured in the form of an sps-PUCCH-AN-List including a plurality of PUCCH resources (based on PF0/1/2/3/4) corresponding to a plurality of different UCI payload sizes, the UE may operate as follows.

A. The UE may multiplex and transmit the HP SPS HARQ-ACK and the LP HARQ-ACK on the HP SPS PUCCH (corresponding to the total payload size of the two UCIs).

B. When the total payload size calculated by adding the payload size ($N_H$ bits) of the HP SPS HARQ-ACK and the payload size ($N_L$ bits) of the LP HARQ-ACK is greater than a maximum UCI payload size ($N_T$ bits) configured for HP SPS PUCCH resources, the UE may operate as follows.

i. Option 1

1. The UE may transmit only the HP SPS HARQ-ACK on the HP SPS PUCCH (corresponding to the payload size $N_H$ bits of the HP SPS HARQ-ACK payload), while dropping the LP HARQ-ACK transmission.

ii. Option 2

1. The UE may multiplex and transmit specific $\{N_T-N_H\}$ bits (e.g., the first $\{N_T-N_H\}$ bits having the lowest bit index) and $N_H$ bits corresponding to the HP SPS HARQ-ACK on the HP SPS PUCCH (corresponding to the maximum UCI payload size, $N_T$ bits) among the LP HARQ-ACK bit(s), while dropping the transmission of the remaining LP HARQ-ACK bits.

iii. Option 3

1. The UE may multiplex and transmit specific $\{N_T+N_H\}$ bits being the sum of LP HARQ-ACK bits(s) and the HP SPS HARQ-ACK bits(s) on the HP SPS PUCCH corresponding to the maximum UCI payload size, $N_T$ bits.

2) When the HP SPS PUCCH is configured in the form of an n1PUCCH-AN including (PF0/1-based) PUCCH resources corresponding to a ½-bit UCI payload size, the following operations may be considered.

A. Option 1 i. The UE may transmit only the HP SPS HARQ-ACK on the HP SPS PUCCH, while dropping the LP HARQ-ACK transmission.

B. Option 2 i. When the HP SPS HARQ-ACK is one bit, the UE may multiplex and transmit a specific one bit (e.g., the first one bit corresponding to the MSB) among the LP HARQ-ACK bit(s) and the one HP SPS HARQ-ACK bit on the HP SPS PUCCH, while dropping the transmission of the remaining LP HARQ-ACK bits.

ii. When the HP SPS HARQ-ACK is two bits, the UE may transmit only the HP SPS HARQ-ACK on the HP SPS PUCCH, while dropping the transmission of the LP HARQ-ACK.

Regarding Option 1 and Option 2, the same one Option (e.g., Option 1) may be applied to the following Case 1 and Case 2 or different Options may be applied to Case 1 and Case 2 (e.g., Option 1 to Case 1 and Option 2 to Case 2).

Case 1: The HP SPS HARQ-ACK is one or more bits (and two or fewer bits), the LP HARQ-ACK is one or more bits, and the total payload size of the two UCIs is greater than two bits.

Case 2: The HP SPS HARQ-ACK is one bit, the LP HARQ-ACK is one bits, and thus the total payload size of the two UCIs is two bits.

When an HP (SPS) PUCCH carrying an HP (SPS) HARQ-ACK and an HP (SR) PUCCH carrying an HP SR (or an HP PUCCH in which the HP (SPS) HARQ-ACK and the HP SR are multiplexed) overlap in time with an LP PUCCH carrying an LP HARQ-ACK (e.g., at least partially over time resources) in a situation in which multiplexed transmission of PUCCHs having different priorities is enabled, the following UE operations may be considered.

1) When the HP SPS PUCCH is configured in the form of an sps-PUCCH-AN-List including a plurality of PUCCH resources (based on PF0/1/2/3/4) corresponding to a plurality of different UCI payload sizes (and when the HP SPS HARQ-ACK is one or more bits, the LP HARQ-ACK is one or more bits, and the total payload size of the two UCIs is greater than two bits), the UE may operate as follows.

A. The UE may multiplex and transmit HP UCI (in which the HP SPS HARQ-ACK and the HP SR are combined) and the LP HARQ-ACK on the HP SPS PUCCH (corresponding to the total payload size of the two UCIs).

B. When the total payload size calculated by adding the payload size ($N_H$ bits) of the HP UCI and the payload size ($N_L$ bits) of the LP HARQ-ACK is greater than a maximum UCI payload size ($N_T$ bits) configured for HP SPS PUCCH resources, the UE may operate as follows.

i. Option 1

1. The UE may transmit only the HP UCI on the HP SPS PUCCH (corresponding to the payload size $N_H$ bits of the HP UCI payload), while dropping the LP HARQ-ACK transmission.

ii. Option 2

1. The UE may multiplex and transmit specific $\{N_T-N_H\}$ bits (e.g., the first $\{N_T-N_H\}$ bits having the lowest bit index) and $N_H$ bits corresponding to the HP UCI on the HP SPS PUCCH (corresponding to the maximum UCI payload size, $N_T$ bits) among the LP HARQ-ACK bit(s), while dropping the transmission of the remaining LP HARQ-ACK bits.

iii. Option 3

1. The UE may multiplex and transmit $\{N_T+N_H\}$ bits being the sum of LP HARQ-ACK bits(s) and the HP UCI bits(s) on the HP SPS PUCCH corresponding to the maximum UCI payload size, $N_T$ bits.

In the above same situation, when the HP SPS HARQ-ACK is one bit, the LP HARQ-ACK is one bit, and thus the total payload size of the two UCIs is two bits, Option 1 may be applied.

2) When the HP SPS PUCCH is configured in the form of an n1PUCCH-AN including (PF0/1-based) PUCCH resources corresponding to a ½-bit UCI payload size (and when the HP SPS HARQ-ACK is one or more bits (and two or fewer bits), the LP HARQ-ACK is one or more bits, and thus the total payload size of the two UCIs is greater than two bits), the following operations may be considered.

A. Option 1 i. The UE may transmit only the HP UCI (e.g., only the HP SPS HARQ-ACK and the HP SR) on the HP SPS PUCCH (when the HP SPS PUCCH is PF0), or on the HP SR PUCCH (when the HP SPS PUCCH is PF1 and the HP SR PUCCH is PF1), while dropping the LP HARQ-ACK transmission.

B. Option 2 i. When the HP SPS HARQ-ACK is one bit, the UE may multiplex and transmit a specific one bit (e.g., the first one bit corresponding to the MSB) among the LP HARQ-ACK bit(s) and the one HP SPS HARQ-ACK bit (and the HP SR) on the HP SPS PUCCH or the HP SR PUCCH, while dropping the transmission of the remaining LP HARQ-ACK bits.

ii. When the HP SPS HARQ-ACK is two bits, the UE may transmit only the HP SPS HARQ-ACK (and the HP SR) on the HP SPS PUCCH (when the HP SPS PUCCH is PF0) or on the HP SR PUCCH (when the HP SPS PUCCH is PF1 and the HP SR PUCCH is PF1), while dropping the LP HARQ-ACK transmission.

In the above same situation, when the HP SPS HARQ-ACK is one bit, the LP HARQ-ACK is one bit, and thus the total payload size of the two UCIs is two bits, Option 1 may be applied.

Figure 12:
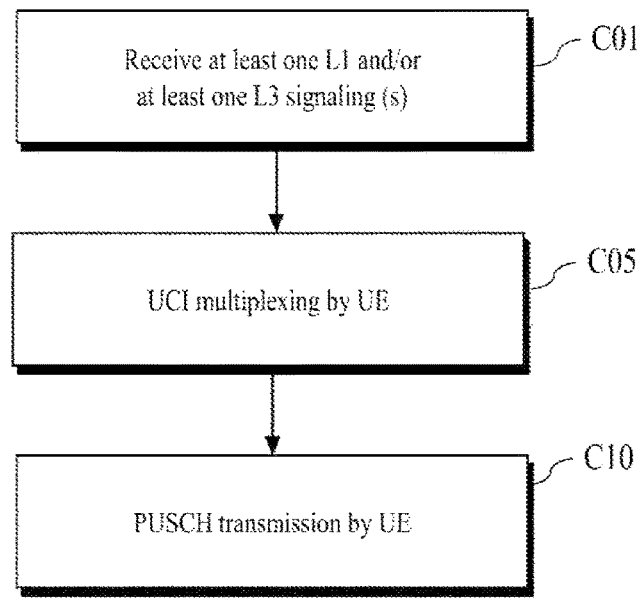
FIGS. 12 and 13 illustrate a signal transmission and reception method according to an embodiment of the disclosure.

FIG. 12 is a flowchart illustrating a method of transmitting a signal by a UE according to an embodiment of the disclosure. FIG. 12 is an implementation example of a possible UE operation according to at least some of the above-described embodiments, and the scope of the disclosure is not limited to FIG. 12. A description redundant to the foregoing description will be avoided, and the foregoing descriptions may be referred to, when needed.

Referring to FIG. 12, the UE may receive at least one layer 1 (L1) signaling (e.g., physical layer signaling) and/or at least one layer 3 (L3) signaling (e.g., RRC signaling) (C01). The at least one L1 signaling and/or the at least one L3 signaling may be related to scheduling that causes multiplexing of UCI(s) (e.g., LP/HP UCIs) on a PUSCH. For example, there may be various examples in which multiplexing of UCI(s) on a PUSCH is caused. The various examples may include a PUSCH transmission (e.g., a PUSCH based on dynamic scheduling DCI and/or a PUSCH based on a configured grant) described before with reference to FIGS. 4 to 8. UCIs multiplexed on a PUSCH may include at least part of Table 8/9, and a situation in which UCI of a PUCCH is multiplexed on a PUSCH due to PUCCH-PUSCH overlap may also be considered.

For example, multiple UCIs including {LP HARQ-ACK, HP CSI part 1, HP CSI part 2} may be multiplexed on an HP PUSCH based on L1 (and/or L3) scheduling (C01) in some cases. Further, for example, multiple UCIs including {LP HARQ-ACK, HP HARQ-ACK, HP CSI part 1, HP CSI part 2} may be multiplexed on an HP PUSCH based on L1 (and/or L3) scheduling (C01) in some cases. More specifically, in a non-limiting example, the L1 (and/or L3) scheduling (C01) may include UL grant format DCI (e.g., DCI format 0_1/0_2 etc.) triggering aperiodic CSI reporting. For example, i) the L1 (and/or L3) scheduling (C01) that the UE receives from the BS may include HP DCI with a priority indication field set to HP (e.g., 1), ii) a CSI request field of the HP DCI may trigger aperiodic CSI reporting for the UE, and iii) the HP DCI may include information about an HP PUSCH resource. When an HP HARQ-ACK is included in UCIs to be multiplexed, the HP HARQ-ACK may be, but not limited to, an HARQ-ACK related to an HP PDSCH scheduled by DL grant HP DCI. The HP HARQ-ACK may be an HARQ-ACK for an HP SPS PDSCH or an HP PDCCH. An LP HARQ-ACK may be, but not limited to, an HARQ-ACK related to an LP PDSCH scheduled by DL grant LP DCI. The LP HARQ-ACK may be an HARQ-ACK for an LP SPS PDSCH or an LP PDCCH. The DL grant LP DCI may DCI that schedules a PDSCH without priority indication information or with a priority indication set to LP (e.g., 0). It may occur that an LP PUCCH resource indicated by the DL grant LP DCI or an LP PUSCH to which an LP HARQ-ACK for the LP PUCCH is piggybacked overlaps with an HP PUSCH resource at least partially (in the time domain). The LP HARQ-ACK is not limited to dynamic scheduling. For example, the LP HARQ-ACK may be related to an SPS PDSCH. This UCI multiplexing on an HP PUSCH is exemplary scheduling to help the understanding of the disclosure. The interpretation of the scope of the disclosure is not necessarily limited to the UCI multiplexing on an HP PUSCH, and all of corresponding examples do not need to be interpreted as essential characteristics.

The UE may multiplex a plurality of UCIs on a single PUSCH (C05).

The UE may transmit the single PUSCH on which the plurality of UCIs are multiplexed (C10).

Based on that i) the UE is configured to multiplex UCIs with different priorities on the same PUSCH, ii) a priority of a first UCI included in the plurality of UCIs is a Priority-H (e.g., HP) higher than a Priority-L (e.g., LP), and iii) 2-part CSI is included in the first UCI with the Priority-H, the UE may drop all HARQ-ACK information of a second UCI with the Priority-L lower than the Priority-H, and map a first part of the CSI and a second part of the CSI on the single PUSCH.

In a state in which the first UCI with the Priority-H does not include any HARQ-ACK information, the UE may perform RE reservation for a potential HARQ-ACK related to the Priority-H on the single PUSCH.

In the state in which the first UCI with the Priority-H does not include any HARQ-ACK information, the UE may perform the multiplexing, assuming that the potential HARQ-ACK related to the Priority-H is UCI type 1.

The UE may perform the multiplexing, assuming that the first part of the CSI and the second part of the CSI are UCI type 2 and UCI type 3, respectively.

Based on HARQ-ACK information in the first UCI with the Priority-H not exceeding 2 bits, the UE may perform RE reservation for the potential HARQ-ACK related to the Priority-H on the single PUSCH, regardless of whether an HARQ-ACK related to the Priority-H actually exists.

The UE may map the first part of the CSI to REs except for specific REs reserved through the RE reservation among available REs on the single PUSCH, and sequentially map the second part of the CSI and data to remaining REs including the specific REs on the single PUSCH, after the mapping of the first part.

Based on the presence of an actual 1-bit or 2-bit HARQ-ACK related to the Priority-H, the UE may puncture the specific REs reserved through the RE reservation and map the 1-bit or 2-bit HARQ-ACK related to the Priority-H, after the mapping of the second part and the data.

The single PUSCH may be a PUSCH with the Priority-H.

The first part and the second part of the CSI with the Priority-H may be related to an aperiodic CSI report.

Figure 13:
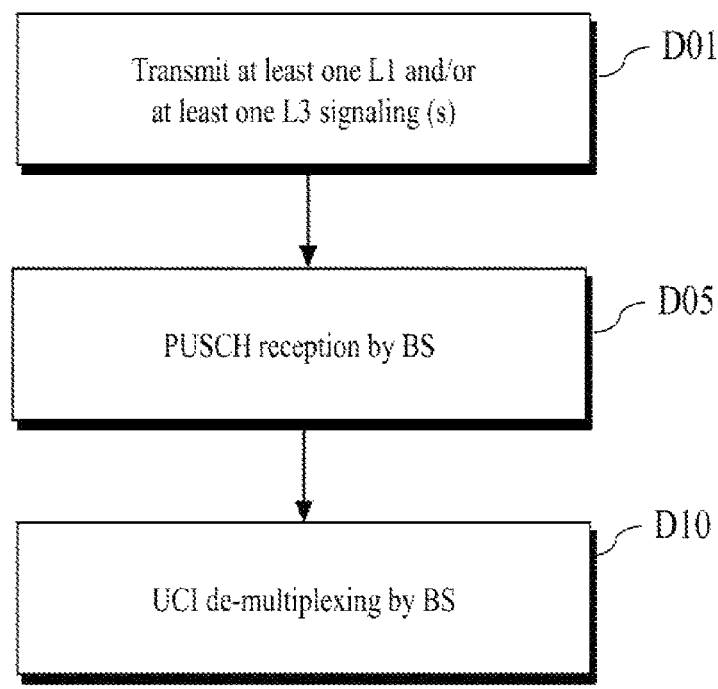

FIG. 13 is a flowchart illustrating a method of receiving a signal by a BS according to an embodiment of the disclosure. FIG. 13 is an implementation example of a possible BS operation according to at least some of the above-described embodiments, and the scope of the disclosure is not limited to FIG. 13. A description redundant to the foregoing description will be avoided, and the foregoing descriptions may be referred to, when needed.

The BS may transmit at least one L1 signaling (e.g., physical layer signaling) and/or at least one L3 signaling (e.g., RRC signaling) (D01). The at least one L1 signaling and/or the at least one L3 signaling may be related to scheduling that causes multiplexing of UCI(s) (e.g., LP/HP UCIs) on a PUSCH. For example, there may be various examples in which multiplexing of UCI(s) on a PUSCH is caused. The various examples may include a PUSCH transmission (e.g., a PUSCH based on dynamic scheduling DCI and/or a PUSCH based on a configured grant) described before with reference to FIGS. 4 to 8. UCIs multiplexed on a PUSCH may include at least part of Table 8/9, and a situation in which a UCI of a PUCCH is multiplexed on a PUSCH due to PUCCH-PUSCH overlap may also be considered.

For example, multiple UCIs including {LP HARQ-ACK, HP CSI part 1, HP CSI part 2} may be multiplexed on an HP PUSCH based on L1 (and/or L3) scheduling (D01) in some cases. Further, for example, multiple UCIs including {LP HARQ-ACK, HP HARQ-ACK, HP CSI part 1, HP CSI part 2} may be multiplexed on an HP PUSCH based on L1 (and/or L3) scheduling (D01) in some cases. More specifically, in a non-limiting example, the L1 (and/or L3) scheduling (D01) may include UL grant format DCI (e.g., DCI format 0_1/0_2 etc.) triggering aperiodic CSI reporting. For example, i) the L1 (and/or L3) scheduling (D01) that the UE receives from the BS may include HP DCI with a priority indication field set to HP (e.g., 1), ii) a CSI request field of the HP DCI may trigger aperiodic CSI reporting for the UE, and iii) the HP DCI may include information about an HP PUSCH resource. When an HP HARQ-ACK is included in UCIs to be multiplexed, the HP HARQ-ACK may be, but not limited to, an HARQ-ACK related to an HP PDSCH scheduled by DL grant HP DCI. The HP HARQ-ACK may be an HARQ-ACK for an HP SPS PDSCH or an HP PDCCH. An LP HARQ-ACK may be, but not limited to, an HARQ-ACK related to an LP PDSCH scheduled by DL grant LP DCI. The LP HARQ-ACK may be an HARQ-ACK for an LP SPS PDSCH or an LP PDCCH. The DL grant LP DCI may DCI that schedules a PDSCH without priority indication information or with a priority indication set to LP (e.g., 0). It may occur that an LP PUCCH resource indicated by the DL grant LP DCI or an LP PUSCH to which an LP HARQ-ACK for the LP PUCCH is piggybacked overlaps with an HP PUSCH resource at least partially (in the time domain). The LP HARQ-ACK is not limited to dynamic scheduling. For example, the LP HARQ-ACK may be related to an SPS PDSCH. This UCI multiplexing on an HP PUSCH is exemplary scheduling to help the understanding of the disclosure. The interpretation of the scope of the disclosure is not necessarily limited to the UCI multiplexing on an HP PUSCH, and all of corresponding examples do not need to be interpreted as essential characteristics.

The BS may receive a single PUSCH from a UE (D05).

The BS may obtain a plurality of UCIs multiplexed on the received single PUSCH (D10).

Based on that i) the BS configures the UE to multiplex UCIs with different priorities on the same PUSCH, ii) a priority of a first UCI included in the plurality of UCIs is a Priority-H higher than a Priority-L, and iii) 2-part CSI is included in the first UCI with the Priority-H, the BS may perform demultiplexing on a first part of the CSI and a second part of the CSI, assuming that all HARQ-ACK information of a second UCI with the Priority-L lower than the Priority-H has been dropped.

In a state in which the first UCI with the Priority-H does not include any HARQ-ACK information, the UE may perform RE reservation for a potential HARQ-ACK related to the Priority-H on the single PUSCH.

In the state in which the first UCI with the Priority-H does not include any HARQ-ACK information, the BS may perform the demultiplexing, assuming that UCI type 1 has been allocated to the potential HARQ-ACK related to the Priority-H.

The BS may perform the demultiplexing, assuming that the first part of the CSI and the second part of the CSI are UCI type 2 and UCI type 3, respectively.

Based on HARQ-ACK information in the first UCI with the Priority-H not exceeding 2 bits, the BS may assume that RE reservation is performed for the potential HARQ-ACK related to the Priority-H on the single PUSCH, regardless of whether an HARQ-ACK related to the Priority-H actually exists.

The BS may assume that the first part of the CSI is mapped to REs except for specific REs reserved through the RE reservation among available REs on the single PUSCH, and the second part of the CSI and data are sequentially mapped to remaining REs including the specific REs on the single PUSCH, after the mapping of the first part.

Based on the presence of an actual 1-bit or 2-bit HARQ-ACK related to the Priority-H, the BS may assume that the UE punctures the specific REs reserved through the RE reservation and maps the 1-bit or 2-bit HARQ-ACK related to the Priority-H, after the mapping of the second part and the data.

The single PUSCH may be a PUSCH with the Priority-H.

The first part and the second part of the CSI with the Priority-H may be related to an aperiodic CSI report.

Figure 14:
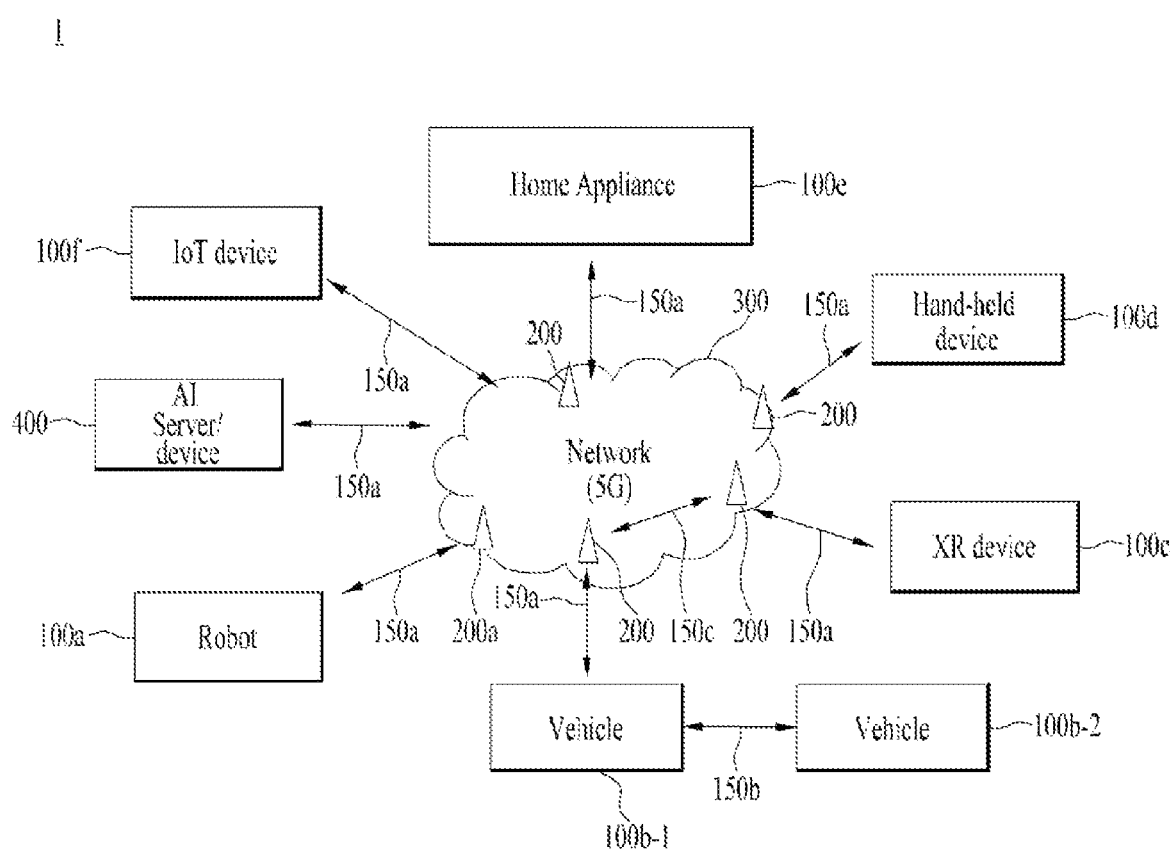
FIGS. 14 to 17 illustrate an example of a communication system 1 and wireless devices applied to the disclosure.

FIG. 14 illustrates a communication system 1 applied to the disclosure.

Referring to FIG. 14, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Figure 15:
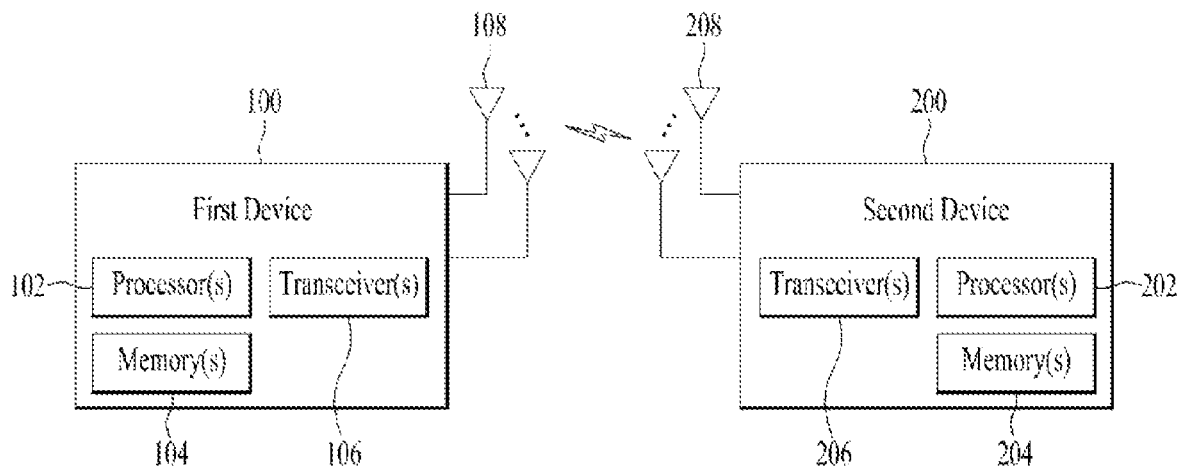

FIG. 15 illustrates wireless devices applicable to the disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMS), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
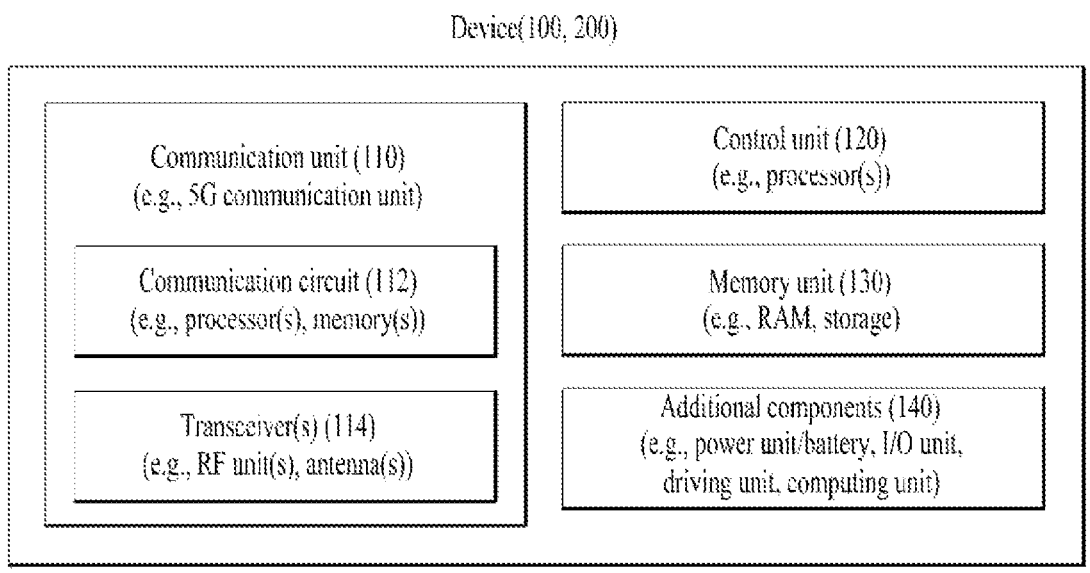

FIG. 16 illustrates another example of a wireless device applied to the disclosure. The wireless device may be implemented in various forms according to a use-case/service (refer to FIG. 14).

Referring to FIG. 16, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 17:
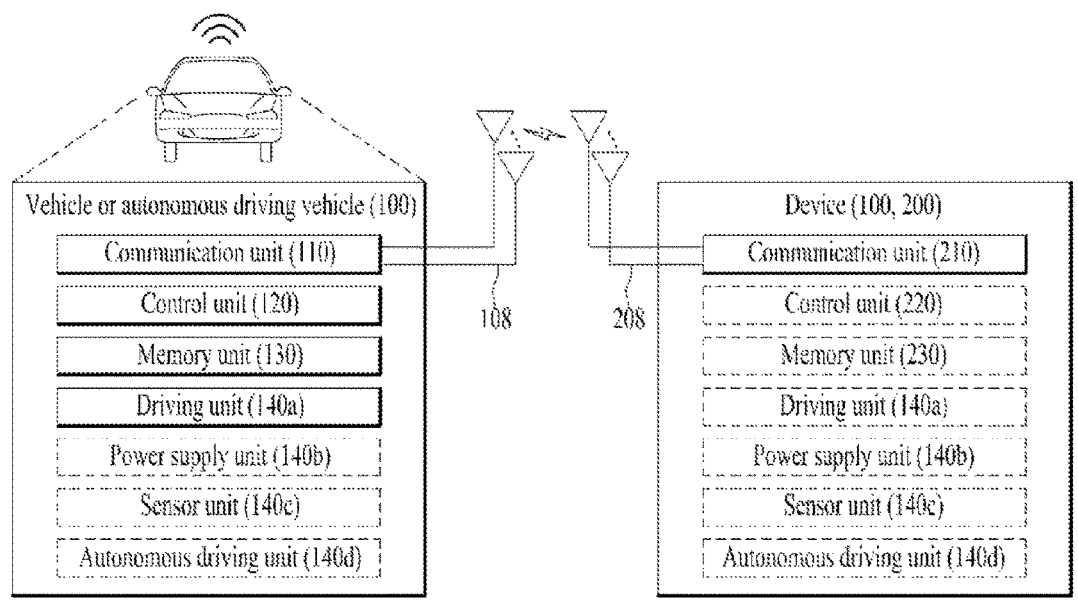

FIG. 17 illustrates a vehicle or an autonomous driving vehicle applied to the disclosure. The vehicle or autonomous driving vehicle may be implemented by a mobile robot, a car, a train, a manned/unmanned Aerial Vehicle (AV), a ship, etc.

Referring to FIG. 17, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 18:
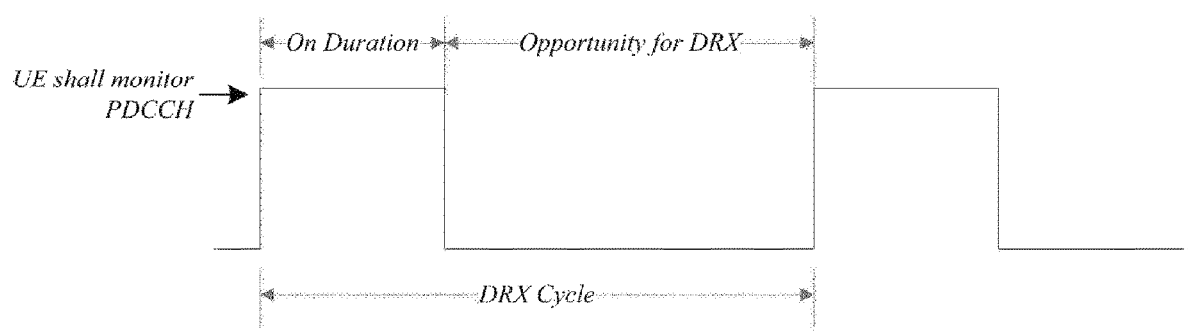
FIG. 18 illustrates an exemplary discontinuous reception (DRX) operation applicable to the disclosure.

FIG. 18 is a diagram illustrating a DRX operation of a UE according to an embodiment of the disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 18, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the disclosure. Irrespective of whether DRX is configured, PDCCH monitoring may be restricted during a time period configured as a measurement gap.

Table 10 describes a DRX operation of a UE (in the RRC_CONNECTED state). Referring to Table 10, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 10

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the disclosure in prescribed forms. And, the respective elements or features may be considered as selective unless they are explicitly mentioned. Each of the elements or features can be implemented in a form failing to be combined with other elements or features. Moreover, it is able to implement an embodiment of the disclosure by combining elements and/or features together in part. A sequence of operations explained for each embodiment of the disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the disclosure may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The disclosure is applicable to UEs, BSs, or other apparatuses in a wireless mobile communication system.

The invention claimed is:

1. A method of transmitting a signal by a user equipment (UE) in a wireless communication system, the method comprising:
multiplexing uplink control information (UCI) in a physical uplink shared channel (PUSCH); and
transmitting the PUSCH,
wherein the UE is configured to multiplex UCIs with different priorities, and
wherein, based on that the UCI multiplexed in the PUSCH includes 2-part channel state information (CSI) including a first part and a second part with a larger priority index between a first priority index and a second priority index, the UE drops hybrid automatic repeat request-acknowledgement (HARQ-ACK) information with a smaller priority index between the first priority index and the second priority index, and multiplexes the first part of the 2-part CSI and the second part of the 2-part CSI in the PUSCH, and
wherein the 2-part CSI including the first part and the second part is related to an aperiodic CSI report.

2. The method according to claim 1, wherein the multiplexing of the UCI is performed by taking potential HARQ-ACK information with the larger priority index as UCI type 1.

3. The method according to claim 2, wherein the multiplexing of the UCI is performed by taking the first part of the 2-part CSI and the second part of the 2-part CSI as UCI type 2 and UCI type 3, respectively.

4. The method according to claim 1, wherein resource element (RE) reservation for potential HARQ-ACK information with the larger priority index is performed in the PUSCH.

5. The method according to claim 4, wherein the RE reservation for the potential HARQ-ACK information with the larger priority index is performed even in a case where the UCI multiplexed in the PUSCH does not include any HARQ-ACK information with the larger priority index.

6. The method according to claim 4, wherein the first part of the 2-part CSI is not mapped to REs reserved for the potential the HARQ-ACK information with the larger priority index, and
wherein, after mapping the first part of the 2-part CSI, the second part of the 2-part CSI and data are mapped to remaining REs including the REs reserved for the potential the HARQ-ACK information with the larger priority index.

7. The method according to claim 6, wherein based on a presence of 1-bit or 2-bit of actual HARQ-ACK with the larger priority index, the UE punctures the second part of the 2-part CSI and the data from the reserved REs and maps the 1-bit or 2-bit of the actual HARQ-ACK with the larger priority index.

8. The method according to claim 1, wherein the PUSCH has the larger priority index.

9. The method according to claim 1, wherein the smaller priority index is an integer 0, and the larger priority index is an integer 1.

10. A non-transitory computer-readable storing instructions for performing the method of claim 1.

11. A device for wireless communication, the device comprising:
a memory configured to store instructions; and
a processor configured to perform operations by executing the instructions, the operations comprising:
multiplexing uplink control information (UCI) in a physical uplink shared channel (PUSCH); and
transmitting the PUSCH,
wherein the device is configured to multiplex UCIs with different priorities, and
wherein, based on that the UCI multiplexed in the PUSCH includes 2-part channel state information (CSI) including a first part and a second part with a larger priority index between a first priority index and a second priority index, the processor drops hybrid automatic repeat request-acknowledgement (HARQ-ACK) information with a smaller priority index between the first priority index and the second priority index, and multiplexes the first part of the 2-part CSI and the second part of the 2-part CSI in the PUSCH, and
wherein the 2-part CSI including the first part and the second part is related to an aperiodic CSI report.

12. The device of claim 11, further comprising:
a transceiver configured to transmit or receive a wireless signal under control of the processor,
wherein the device is a user equipment (UE) configured to operate in a wireless communication system.

13. The device of claim 11, wherein the device is an application specific integrated circuit (ASIC) or a digital signal processing device configured control a user equipment (UE) to operate in a wireless communication system.

14. A method of receiving a signal by a base station (BS) in a wireless communication system, the method comprising:
receiving, from a user equipment (UE), a physical uplink shared channel (PUSCH); and
obtaining uplink control information (UCI) multiplexed in the received PUSCH,
wherein the BS configures the UE to multiplex UCIs with different priorities, and
wherein, based on that the UCI multiplexed in the PUSCH includes 2-part channel state information (CSI) including a first part and a second part with a larger priority index between a first priority index and a second priority index, hybrid automatic repeat request-acknowledgement (HARQ-ACK) information with a smaller priority index between the first priority index and the second priority index is dropped, and the first part of the 2-part CSI and the second part of the 2-part CSI are multiplexed in the PUSCH, and
wherein the 2-part CSI including the first part and the second part is related to an aperiodic CSI report.

15. A base station (BS) for wireless communication, the BS comprising:
a transceiver; and
a processor configured to receive, through transceiver from a user equipment (UE), a physical uplink shared channel (PUSCH) and to obtain uplink control information (UCI) multiplexed in the received PUSCH,
wherein the processor configures the UE to multiplex UCIs with different priorities, and
wherein, based on that the UCI multiplexed in the PUSCH includes 2-part channel state information (CSI) including a first part and a second part with a larger priority index between a first priority index and a second priority index, hybrid automatic repeat request-acknowledgement (HARQ-ACK) information with a smaller priority index between the first priority index and the second priority index is dropped, and the first part of the 2-part CSI and the second part of the 2-part CSI are multiplexed in the PUSCH, and wherein the 2-part CSI including the first part and the second part is related to an aperiodic CSI report.

* * * * *